United States Patent
Renders et al.

(10) Patent No.: US 8,812,496 B2
(45) Date of Patent: Aug. 19, 2014

(54) RELEVANT PERSONS IDENTIFICATION LEVERAGING BOTH TEXTUAL DATA AND SOCIAL CONTEXT

(75) Inventors: Jean-Michel Renders, Quaix-en-Charteuse (FR); Amin Mantrach, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/422,189

(22) Filed: Mar. 16, 2012

(65) Prior Publication Data

US 2013/0103681 A1    Apr. 25, 2013

Related U.S. Application Data

(60) Provisional application No. 61/550,586, filed on Oct. 24, 2011.

(51) Int. Cl.
*G06F 17/30* (2006.01)

(52) U.S. Cl.
CPC .......... *G06F 17/30* (2013.01); *G06F 17/30864* (2013.01)
USPC ............ 707/728; 707/706; 707/710; 707/723

(58) Field of Classification Search
CPC ................................................ G06F 17/30864
USPC .......................... 707/728, 706, 710, 723, 749
See application file for complete search history.

(56) References Cited

U.S. PATENT DOCUMENTS

| | | | |
|---|---|---|---|
| 6,208,988 B1 * | 3/2001 | Schultz | 1/1 |
| 7,082,427 B1 * | 7/2006 | Seibel et al. | 707/661 |
| 7,333,966 B2 * | 2/2008 | Dozier | 706/21 |
| 7,739,231 B2 | 6/2010 | Flinn et al. | |
| 8,024,312 B2 * | 9/2011 | Wang et al. | 707/705 |
| 8,112,421 B2 * | 2/2012 | Sun et al. | 707/737 |
| 8,364,693 B2 * | 1/2013 | Peters et al. | 707/765 |
| 8,447,775 B2 * | 5/2013 | Vronay et al. | 707/765 |
| 2003/0028524 A1 * | 2/2003 | Keskar et al. | 707/3 |
| 2006/0036593 A1 * | 2/2006 | Dean et al. | 707/4 |
| 2009/0106370 A1 * | 4/2009 | Dreyfus et al. | 709/206 |
| 2009/0111447 A1 * | 4/2009 | Nurmi | 455/418 |

(Continued)

OTHER PUBLICATIONS

Backstrom, et al. "Supervised random walks: predicting and recommending links in social networks" Proc. of the Fourth Intl. Conf. on Web search and web data mining, WSDM'11, 2011, pp. 635-344.

(Continued)

*Primary Examiner* — Miranda Le
(74) *Attorney, Agent, or Firm* — Fay Sharpe LLP

(57) ABSTRACT

A set of documents is annotated by metadata specifying persons associated with documents and their social roles in the documents. The annotated documents define a group of representation modes including at least one content type and at least one social role. An electronic processing device computes a relevance score for a person of interest using a set of queries each having a target social role by performing a sequence of operations that includes the following operations: computing similarities between documents and queries with respect to at least one similarity mode of the group of representation modes; enriching queries or documents to identify and aggregate nearest neighbor documents that are most similar with respect to at least one enrichment mode of the group of representation modes; aggregating over documents; aggregating over queries; and aggregating over at least one of (i) enrichment modes, (ii) similarity modes, and (iii) target social roles.

16 Claims, 8 Drawing Sheets

(56) References Cited

U.S. PATENT DOCUMENTS

| | | | |
|---|---|---|---|
| 2010/0082331 A1* | 4/2010 | Brun et al. | 704/9 |
| 2010/0082615 A1* | 4/2010 | Clinchant et al. | 707/728 |
| 2010/0198802 A1* | 8/2010 | Kraftsow et al. | 707/706 |
| 2011/0119264 A1 | 5/2011 | Hu et al. | |
| 2011/0153635 A1* | 6/2011 | Figueroa et al. | 707/766 |
| 2011/0225139 A1* | 9/2011 | Wang et al. | 707/709 |
| 2011/0282855 A1* | 11/2011 | Ronen et al. | 707/706 |
| 2012/0323877 A1* | 12/2012 | Ray et al. | 707/706 |

OTHER PUBLICATIONS

Balog, et al. "A language modeling framework for expert finding" Inf. Process. Manage, 2009, 45(1):1-19.

Calado, et al. "Combining link-based and content-based methods for web document classification" Proc. of the twelfth international Conf. on Information and Knowledge Management of data, 2003, pp. 394-401.

Chakrabarti, et al. "Enhanced hypertext categorization using hyperlinks" Proc. of the 1998 ACM SIGMOD Intl. Conf. on Management of Data, 1998, pp. 307-318.

Chen, et al. "An asymptotic analysis of some expert fusion methods" Pattern Recognition Letters, 2001, 22:901-904.

Cohn, et al. "The missing link—a probabilistic model of document content and hypertext connectivity" Neural Information Processing Systems Conference, NIPS 2000, pp. 430-436.

Dubois, et al. "Assessing the value of a candidate: comparing belief function and possibility theories" Proc. of the Fifteenth International Conf. on Uncertainty in Artificial Intelligence, 1999, pp. 170-177.

Joachims, et al. "Composite kernels for hypertext categorization" Proc. of the Intl. Conf. on Machine Learning (ICML 2001), 2001, pp. 250-257.

Kittler, et al. "Sum versus vote fusion in multiple classifier systems" IEEE Trans. on Pattern Analysis and Machine Intelligence, 2003, 25(1):110-115.

Kittler, et al. "On combining classifiers" IEEE Trans. on Pattern Analysis and Machine Intelligence, 20(3):226-239.

Klimt, et al. "The enron corpus: a new dataset for email classification research" Proc. of the 15$^{th}$ European Conf. on Machine Learning, Sep. 20-24, 2004, pp. 217-226.

MacSkassy, S. A. "Improving learning in networked data by combining explicit and mined links" Proc. of the 22th conf. on artificial intelligence (AAAI'2007), pp. 590-595.

MacSkassy, et al. "Classification in networked data: a toolkit and a univariate case study" Journal of Machine Learning Research, 2007, 8:935-983.

Maes, et al. "Simulated iterative classification: a new learning procedure for graph labeling" Proc. of the European Conf. on Machine Learning (ECML 2009), pp. 47-62.

McCallum, et al. "Topic and role discovery in social networks with experiments on enron and academic email" J. Artif. Intell. Res. (JAIR), 30:249-272.

McDonald, et al. "A comparison of score, rank and probability-based fusion methods for video shot retrieval" Proc. of the 4$^{th}$ Intl. Conf. on Image and Video Retrieval, CIVR 2005, Jul. 25-22, 2005, pp. 61-70.

Mensink, et al. "Transmedia relevance feedback for image autoannotation" Proc. of British Machine Vision Conf. BMVC 2010, Aug. 31-Sep. 3, 2010, pp. 1-12.

Merz, C. "Using correspondence analysis to combine classifiers" Machine Learning, 1999, 36:226-239.

Mimno, et al. "Expertise modeling for matching papers with reviewers" Proc. of the 13$^{th}$ ACM SIGKDD Intl. Conf. on Knowledge Discovery and Data mining, Aug. 12-15, 2007, pp. 500-509.

Oh, et al. "A practical hypertext categorization method using links and incrementally available class information" Proc. of the 23$^{rd}$ Intl. ACM Conf. on Research and Development in Information Retrieval (SIGIR 2000), pp. 264-271.

Saerens, et al. "Yet another method for combining classifiers outputs: A maximum entropy approach" Proc. of the 5$^{th}$ international workshop on Multiple classifier systems (MCS 2004), pp. 82-91.

Slattery, et al. "Discovering test set regularities in relational domains" Proc. of the 7$^{th}$ international conf. on machine learning (ICML 2000), 2000, pp. 895-902.

Smirnova, et al. "A user-oriented model for expert finding" Advances in Information Retrieval 33$^{rd}$ European Conf. on IR Research, ECIR 2011, Apr. 18-21, 2011, pp. 580-592.

Tang, et al. "Clustering with multiple graphs" Proc. of the Ninth IEEE Intl. Conf. on Data Mining, Dec. 6-9, 2009, pp. 1016-1021.

Zhai, et al. "A study of smoothing methods for language models applied to ad hoc information retrieval" Proc. of the 24$^{th}$ Annual Intl. ACM SIGIR Conf. on Research and Development in Information Retrieval, Sep. 9-13, 2001, pp. 334-342.

Zhou, et al. "Spectral clustering and transductive learning with multiple views" Proc. of the Twenty-fourth international conf. (ICML 2007), Jun. 20-24, 2007, pp. 1159-1166.

Zhu, et al. "Combining content and link for classification using matrix factorization" Proc. of the 30$^{th}$ Intl. ACM Conf. on Research and Development in Information Retrieval (SIGIR 2007), 2007, pp. 487-494.

\* cited by examiner

| w | QE | DE | m' | m'' | k | d | Sequence |
|---|----|----|----|-----|---|---|----------|
| 1 | 0 | 0 | N/A | N/A | B | B | $\oplus_{r'}, \oplus_m C^{(m)}(\oplus_d^{r'} x^d, \oplus_k^{r'} q^k)$ |
| 2 | 0 | 0 | N/A | N/A | B | A | $\oplus_{r'}, \oplus_m, \oplus_d^{r'} C^{(m)}(x^d, \oplus_k^{r'} q^k)$ |
| 3 | 0 | 0 | N/A | N/A | A | B | $\oplus_{r'}, \oplus_m, \oplus_k^{r'} C^{(m)}(\oplus_d^{r'} x^d, q^k)$ |
| 4 | 0 | 0 | N/A | N/A | A | A | $\oplus_{r'}, \oplus_m, \oplus_d^{r'}, \oplus_k^{r'} C^{(m)}(x^d, q^k)$ |
| 5 | 1 | 0 | N/A | B | B | B | $\oplus_{r'}, \oplus_m, \oplus_d^{r'} C^{(m)}(\oplus_d^{r'} x^d, \oplus_k^{r'} \mathcal{E}^{(m'')}(q^k))$ |
| 6 | 1 | 0 | N/A | B | B | A | $\oplus_{r'}, \oplus_m, \oplus_d^{r'} C^{(m)}(x^d, \oplus_k^{r'} \mathcal{E}^{(m'')}(q^k))$ |
| 7 | 1 | 0 | N/A | B | A | B | $\oplus_{r'}, \oplus_m, \oplus_k^{r'} C^{(m)}(\oplus_d^{r'} x^d, \mathcal{E}^{(m'')}(q^k))$ |
| 8 | 1 | 0 | N/A | B | A | A | $\oplus_{r'}, \oplus_m, \oplus_d^{r'}, \oplus_k^{r'} C^{(m)}(x^d, \mathcal{E}^{(m'')}(q^k))$ |
| 9 | 1 | 0 | N/A | A | B | B | $\oplus_{r'}, \oplus_m, \oplus_{m''} \oplus_d^{r'} C^{(m)}(\oplus_d^{r'} x^d, \oplus_k^{r'} \mathcal{E}^{(m'')}(q^k))$ |
| 10 | 1 | 0 | N/A | A | B | A | $\oplus_{r'}, \oplus_m, \oplus_{m''} \oplus_d^{r'} C^{(m)}(x^d, \oplus_k^{r'} \mathcal{E}^{(m'')}(q^k))$ |
| 11 | 1 | 0 | N/A | A | A | B | $\oplus_{r'}, \oplus_m, \oplus_{m''} \oplus_k^{r'} C^{(m)}(\oplus_d^{r'} x^d, \mathcal{E}^{(m'')}(q^k))$ |
| 12 | 1 | 0 | N/A | A | A | A | $\oplus_{r'}, \oplus_m, \oplus_{m''} \oplus_d^{r'}, \oplus_k^{r'} C^{(m)}(x^d, \mathcal{E}^{(m'')}(q^k))$ |
| 13 | 0 | 1 | B | N/A | B | B | $\oplus_{r'}, \oplus_m, \oplus_d^{r'} C^{(m)}(\oplus_d^{r'} \mathcal{E}^{(m')}(x^d), \oplus_k^{r'} q^k)$ |
| 14 | 0 | 1 | B | N/A | B | A | $\oplus_{r'}, \oplus_m, \oplus_d^{r'} C^{(m)}(\mathcal{E}^{(m')}(x^d), \oplus_k^{r'} q^k)$ |
| 15 | 0 | 1 | B | N/A | A | B | $\oplus_{r'}, \oplus_m, \oplus_k^{r'} C^{(m)}(\oplus_d^{r'} \mathcal{E}^{(m')}(x^d), q^k)$ |
| 16 | 0 | 1 | B | N/A | A | A | $\oplus_{r'}, \oplus_m, \oplus_d^{r'}, \oplus_k^{r'} C^{(m)}(\mathcal{E}^{(m')}(x^d), q^k)$ |
| 17 | 0 | 1 | A | N/A | B | B | $\oplus_{r'}, \oplus_m, \oplus_{m'} C^{(m)}(\oplus_d^{r'} \mathcal{E}^{(m')}(x^d), \oplus_k^{r'} q^k)$ |
| 18 | 0 | 1 | A | N/A | B | A | $\oplus_{r'}, \oplus_m, \oplus_{m'} \oplus_d^{r'} C^{(m)}(\mathcal{E}^{(m')}(x^d), \oplus_k^{r'} q^k)$ |
| 19 | 0 | 1 | A | N/A | A | B | $\oplus_{r'}, \oplus_m, \oplus_{m'} \oplus_k^{r'} C^{(m)}(\oplus_d^{r'} \mathcal{E}^{(m')}(x^d), q^k)$ |
| 20 | 0 | 1 | A | N/A | A | A | $\oplus_{r'}, \oplus_m, \oplus_{m'} \oplus_d^{r'}, \oplus_k^{r'} C^{(m)}(\mathcal{E}^{(m')}(x^d), q^k)$ |

| w | Sequence |
|---|---|
| 5bis | $\oplus_{r'} \oplus_m \mathcal{C}^{(m)}(\oplus_d^{r'} \mathbf{x}^d, \oplus_{m''} \mathcal{E}^{(m'')}(\oplus_k^{r'} \mathbf{q}^k))$ |
| 6bis | $\oplus_{r'} \oplus_m \oplus_d^{r'} \mathcal{C}^{(m)}(\mathbf{x}^d, \oplus_{m''} \mathcal{E}^{(m'')}(\oplus_k^{r'} \mathbf{q}^k))$ |
| 9bis | $\oplus_{r'} \oplus_m \oplus_{m''} \mathcal{C}^{(m)}(\oplus_d^{r'} \mathbf{x}^d, \mathcal{E}^{(m'')}(\oplus_k^{r'} \mathbf{q}^k))$ |
| 10bis | $\oplus_{r'} \oplus_m \oplus_{m''} \oplus_d^{r'} \mathcal{C}^{(m)}(\mathbf{x}^d, \mathcal{E}^{(m'')}(\oplus_k^{r'} \mathbf{q}^k))$ |
| 13bis | $\oplus_{r'} \oplus_m \mathcal{C}^{(m)}(\oplus_{m'} \mathcal{E}^{(m')}(\oplus_d^{r'} \mathbf{x}^d), \oplus_k^{r'} \mathbf{q}^k)$ |
| 15bis | $\oplus_{r'} \oplus_m \oplus_k^{r'} \mathcal{C}^{(m)}(\oplus_{m'} \mathcal{E}^{(m')}(\oplus_d^{r'} \mathbf{x}^d), \mathbf{q}^k)$ |
| 17bis | $\oplus_{r'} \oplus_m \oplus_{m'} \mathcal{C}^{(m)}(\mathcal{E}^{(m')}(\oplus_d^{r'} \mathbf{x}^d), \oplus_k^{r'} \mathbf{q}^k)$ |
| 19bis | $\oplus_{r'} \oplus_m \oplus_{m'} \oplus_k^{r'} \mathcal{C}^{(m)}(\mathcal{E}^{(m')}(\oplus_d^{r'} \mathbf{x}^d), \mathbf{q}^k)$ |
| 21bis | $\oplus_{r'} \oplus_m \mathcal{C}^{(m)}(\oplus_{m'} \mathcal{E}^{(m')}(\oplus_d^{r'} \mathbf{x}^d), \oplus_k^{r'} \oplus_{m''} \mathcal{E}^{(m'')}(\mathbf{q}^k))$ |
| 21ter | $\oplus_{r'} \oplus_m \mathcal{C}^{(m)}(\oplus_d^{r'} \oplus_{m'} \mathcal{E}^{(m')}(\mathbf{x}^d), \oplus_{m''} \mathcal{E}^{(m'')}(\oplus_k^{r'} \mathbf{q}^k))$ |
| 21quater | $\oplus_{r'} \oplus_m \mathcal{C}^{(m)}(\oplus_{m'} \mathcal{E}^{(m')}(\oplus_d^{r'} \mathbf{x}^d), \oplus_{m''} \mathcal{E}^{(m'')}(\oplus_k^{r'} \mathbf{q}^k))$ |
| 22bis | $\oplus_{r'} \oplus_m \oplus_d^{r'} \mathcal{C}^{(m)}(\oplus_{m'} \mathcal{E}^{(m')}(\mathbf{x}^d), \oplus_{m''} \mathcal{E}^{(m'')}(\oplus_k^{r'} \mathbf{q}^k))$ |
| 23bis | $\oplus_{r'} \oplus_m \oplus_k^{r'} \mathcal{C}^{(m)}(\oplus_{m'} \mathcal{E}^{(m')}(\oplus_d^{r'} \mathbf{x}^d), \oplus_{m''} \mathcal{E}^{(m'')}(\mathbf{q}^k))$ |
| 25bis | $\oplus_{r'} \oplus_m \oplus_{m''} \mathcal{C}^{(m)}(\oplus_{m'} \mathcal{E}^{(m')}(\oplus_d^{r'} \mathbf{x}^d), \oplus_k^{r'} \mathcal{E}^{(m'')}(\mathbf{q}^k))$ |
| 25ter | $\oplus_{r'} \oplus_m \oplus_{m''} \mathcal{C}^{(m)}(\oplus_d^{r'} \oplus_{m'} \mathcal{E}^{(m')}(\mathbf{x}^d), \mathcal{E}^{(m'')}(\oplus_k^{r'} \mathbf{q}^k))$ |
| 25quater | $\oplus_{r'} \oplus_m \oplus_{m''} \mathcal{C}^{(m)}(\oplus_{m'} \mathcal{E}^{(m')}(\oplus_d^{r'} \mathbf{x}^d), \mathcal{E}^{(m'')}(\oplus_k^{r'} \mathbf{q}^k))$ |
| 26bis | $\oplus_{r'} \oplus_m \oplus_{m''} \oplus_d^{r'} \mathcal{C}^{(m)}(\oplus_{m'} \mathcal{E}^{(m')}(\mathbf{x}^d), \mathcal{E}^{(m'')}(\oplus_k^{r'} \mathbf{q}^k))$ |
| 27bis | $\oplus_{r'} \oplus_m \oplus_{m''} \oplus_k^{r'} \mathcal{C}^{(m)}(\oplus_{m'} \mathcal{E}^{(m')}(\oplus_d^{r'} \mathbf{x}^d), \mathcal{E}^{(m'')}(\mathbf{q}^k))$ |
| 29bis | $\oplus_{r'} \oplus_m \oplus_{m'} \mathcal{C}^{(m)}(\mathcal{E}^{(m')}(\oplus_d^{r'} \mathbf{x}^d), \oplus_k^{r'} \oplus_{m''} \mathcal{E}^{(m'')}(\mathbf{q}^k))$ |
| 29ter | $\oplus_{r'} \oplus_m \oplus_{m'} \mathcal{C}^{(m)}(\oplus_d^{r'} \mathcal{E}^{(m')}(\mathbf{x}^d), \oplus_{m''} \mathcal{E}^{(m'')}(\oplus_k^{r'} \mathbf{q}^k))$ |
| 29quater | $\oplus_{r'} \oplus_m \oplus_{m'} \mathcal{C}^{(m)}(\mathcal{E}^{(m')}(\oplus_d^{r'} \mathbf{x}^d), \oplus_{m''} \mathcal{E}^{(m'')}(\oplus_k^{r'} \mathbf{q}^k))$ |
| 30bis | $\oplus_{r'} \oplus_m \oplus_{m'} \oplus_d^{r'} \mathcal{C}^{(m)}(\mathcal{E}^{(m')}(\mathbf{x}^d), \oplus_{m''} \mathcal{E}^{(m'')}(\oplus_k^{r'} \mathbf{q}^k))$ |
| 31bis | $\oplus_{r'} \oplus_m \oplus_{m'} \oplus_k^{r'} \mathcal{C}^{(m)}(\mathcal{E}^{(m')}(\oplus_d^{r'} \mathbf{x}^d), \oplus_{m''} \mathcal{E}^{(m'')}(\mathbf{q}^k))$ |
| 33bis | $\oplus_{r'} \oplus_m \oplus_{m'} \oplus_{m''} \mathcal{C}^{(m)}(\mathcal{E}^{(m')}(\oplus_d^{r'} \mathbf{x}^d), \oplus_k^{r'} \mathcal{E}^{(m'')}(\mathbf{q}^k))$ |
| 33ter | $\oplus_{r'} \oplus_m \oplus_{m'} \oplus_{m''} \mathcal{C}^{(m)}(\oplus_d^{r'} \mathcal{E}^{(m')}(\mathbf{x}^d), \mathcal{E}^{(m'')}(\oplus_k^{r'} \mathbf{q}^k))$ |
| 33quater | $\oplus_{r'} \oplus_m \oplus_{m'} \oplus_{m''} \mathcal{C}^{(m)}(\mathcal{E}^{(m')}(\oplus_d^{r'} \mathbf{x}^d), \mathcal{E}^{(m'')}(\oplus_k^{r'} \mathbf{q}^k))$ |
| 34bis | $\oplus_{r'} \oplus_m \oplus_{m'} \oplus_{m''} \oplus_d^{r'} \mathcal{C}^{(m)}(\mathcal{E}^{(m')}(\mathbf{x}^d), \mathcal{E}^{(m'')}(\oplus_k^{r'} \mathbf{q}^k))$ |
| 35bis | $\oplus_{r'} \oplus_m \oplus_{m'} \oplus_{m''} \oplus_k^{r'} \mathcal{C}^{(m)}(\mathcal{E}^{(m')}(\oplus_d^{r'} \mathbf{x}^d), \mathcal{E}^{(m'')}(\mathbf{q}^k))$ |

FIG. 8

RELEVANT PERSONS IDENTIFICATION LEVERAGING BOTH TEXTUAL DATA AND SOCIAL CONTEXT

This application claims the benefit of U.S. Provisional Application No. 61/550,586 filed Oct. 24, 2011. U.S. Provisional Application No. 61/550,586 filed Oct. 24, 2011 is incorporated by reference herein in its entirety.

BACKGROUND

The following relates to the information management arts, relevant person identification arts, data mining arts, and related arts.

Increasingly, documents are being stored and manipulated collaboratively, and are annotated with social context metadata specifying persons associated with a document and their various roles. For example, an electronic mail (that is, "email") message is typically annotated with information such as the "sender" (i.e., author) and the list of recipients. Typically, these persons are identified by their email addresses, although some email systems may also use personal names when available. A scientific paper in electronic form (e.g., a pdf document) may be annotated with social context metadata such as the authors of the scientific paper, the authors of references cited in the scientific paper, the conference or journal editor, the conference session chairperson, or so forth. Here people are usually identified by legal or commonly used names, e.g. in a "first name" "last name" format, possibly with an intervening middle name or middle initial. A document on a social media network or blog may be annotated by the document owner, the document creator (who may or may not be the same as the document owner), persons who have left comments about the document, or so forth. In this environment a person is typically identified by a nickname, user name, login name, or other naming convention employed by the social media network.

The foregoing are merely illustrative examples. It is seen that the social context includes more than simply a list of the names of persons associated with a document. The social context also identifies the roles of those persons within the social context. For example, associating "John Smith" with an email as the "sender" has a different significance than associating "John Smith" with an email as a recipient. The social context role of the person can be indicative of the extent of the person's involvement in the document (e.g., an author of a paper is usually much more involved with the paper than the author of a reference cited in the paper) and the nature of that involvement (e.g., the paper author has an active, creative role whereas the author of a reference has a passive role). The person's role in a document can also be indicative of that person's social status. For example, the journal editor is typically a senior scientist, whereas the author of a paper appearing in the journal may be a senior scientist, a junior scientist, or an undergraduate student.

Database operations typically focus on document retrieval. However, it can also be useful to leverage a database that contains documents annotated with social context information to identify persons who meet specified selection criteria. For example, a human resources department seeking to fill a skilled position might consider using a database of scientific papers to identify well-qualified candidates for the skilled position.

However, such searching employing existing database systems can be tedious. In the above example, the human resources department may be able to obtain a list of authors of papers directed to subject matter pertaining to the skill set of the skilled position using keyword searching; but then, someone must cull through that list to identify suitable candidates. Many of the listed authors may be too junior for a senior position (that is, underqualified) or, alternatively, too senior for a more junior position (that is, overqualified). Such existing approaches are also prone to missing relevant persons. For example, the aforementioned search may miss persons who do not publish frequently, perhaps because their current employer discourages publication, even though those persons may be visibly active in other ways such as serving on conference committees or by editing special journal issues.

BRIEF DESCRIPTION

In some illustrative embodiments disclosed as illustrative examples herein, a set of documents is annotated by metadata specifying persons associated with documents and their social roles in the documents. The annotated documents define a group of representation modes including at least one content type and at least one social role. An electronic processing device computes a relevance score for a person of interest using a set of queries each having a target social role by performing a sequence of operations that includes the following operations: computing similarities between documents and queries with respect to at least one similarity mode of the group of representation modes; enriching queries or documents to identify and aggregate nearest neighbor documents that are most similar with respect to at least one enrichment mode of the group of representation modes; aggregating over documents; aggregating over queries; and aggregating over at least one of (i) enrichment modes, (ii) similarity modes, and (iii) target social roles. In some embodiments the electronic processing device computes the relevance score by performing one of the relevance scoring sequences $R_\omega(p,Q)$ listed in the tables in FIGS. 6, 7, and 8 wherein $\omega \notin \{1, 2, 3, 4\}$, p denotes the person of interest, Q denotes the set of queries, k indexes the queries of the set of queries, d indexes the documents, m indexes the at least one similarity mode, at least one of m' and m" index the at least one enrichment mode.

In some illustrative embodiments disclosed as illustrative examples herein, in a system as set forth in the immediately preceding paragraph the electronic processing device is further configured to perform operations including: repeating the computing for each person of a set of persons of interest to compute a relevance score for each person of the set of persons of interest, and at least one of (i) ranking the persons of the set of persons of interest respective to relevance score and (ii) selecting a sub set of persons from the set of persons of interest who have the highest relevance scores. In some illustrative embodiments disclosed as illustrative examples herein, in a system as set forth in the immediately preceding paragraph the set of documents comprises a set of electronic mail (email) documents, the annotated metadata specifies persons associated with email documents at least using email addresses, and the social roles in the documents include at least (i) email sender and (ii) email recipient.

In some illustrative embodiments disclosed as illustrative examples herein, a method is operative on a set of documents annotated by metadata specifying persons associated with documents and their social context roles in the documents. The method comprises: (0) receiving or generating a query comprising a content query portion, a social context query portion, and a target social context role; (1) for each document, computing a content based score respective to the content query portion of the query and a social context based score respective to the social context query portion of the query; (2) for each document, computing an enrichment score quantifying similarity of the document with a sub set of nearest neighbor documents selected from the set of documents based on scores computed in operation (1); (3) for each document, aggregating the scores computed in operations (1) and (2) to generate a query score for the document; and (4) generating a relevance score for a person of interest by aggregating the query scores computed in operation (3) for the documents of the set of documents that have the person of interest in the target social context role. The operations (1), (2), (3), and (4) are suitably performed by an electronic data processing device.

In some illustrative embodiments disclosed as illustrative examples herein, a storage medium is disclosed which stores instructions executable by a digital processor to perform a method as set forth in the immediately preceding paragraph.

BRIEF DESCRIPTION OF THE DRAWINGS

FIGS. 6-8 show tables of distinct relevance scoring sequences (or ways) $R_\omega(p,Q)$ for use in computing relevance scores as disclosed herein.

DETAILED DESCRIPTION

In the following, "relevant person identification" or similar phraseology denotes identification of a relevant person (or persons) using a suitable identifier. For example, in the context of an email database a suitable identifier may be an email address. In the context of a social media network a suitable identifier may be a nickname, user name, login name, or other name under which a person is known on the social media network. In the context of a scientific papers repository, a suitable identifier may be a given or legal name. A given physical person may, in some instances, have two or more identifiers—for example, a single physical person may have two different email addresses. In such a case each email address is treated as a distinct "person" for the purposes of the relevant person identification. (However, in some embodiments disclosed herein the relevant persons identification is usefully applied to detect such a situation. The two "persons" represented by the two different email addresses are likely to be found to be highly relevant to each other, and hence may be proposed as possible email aliases for the same physical person).

Figure 1:
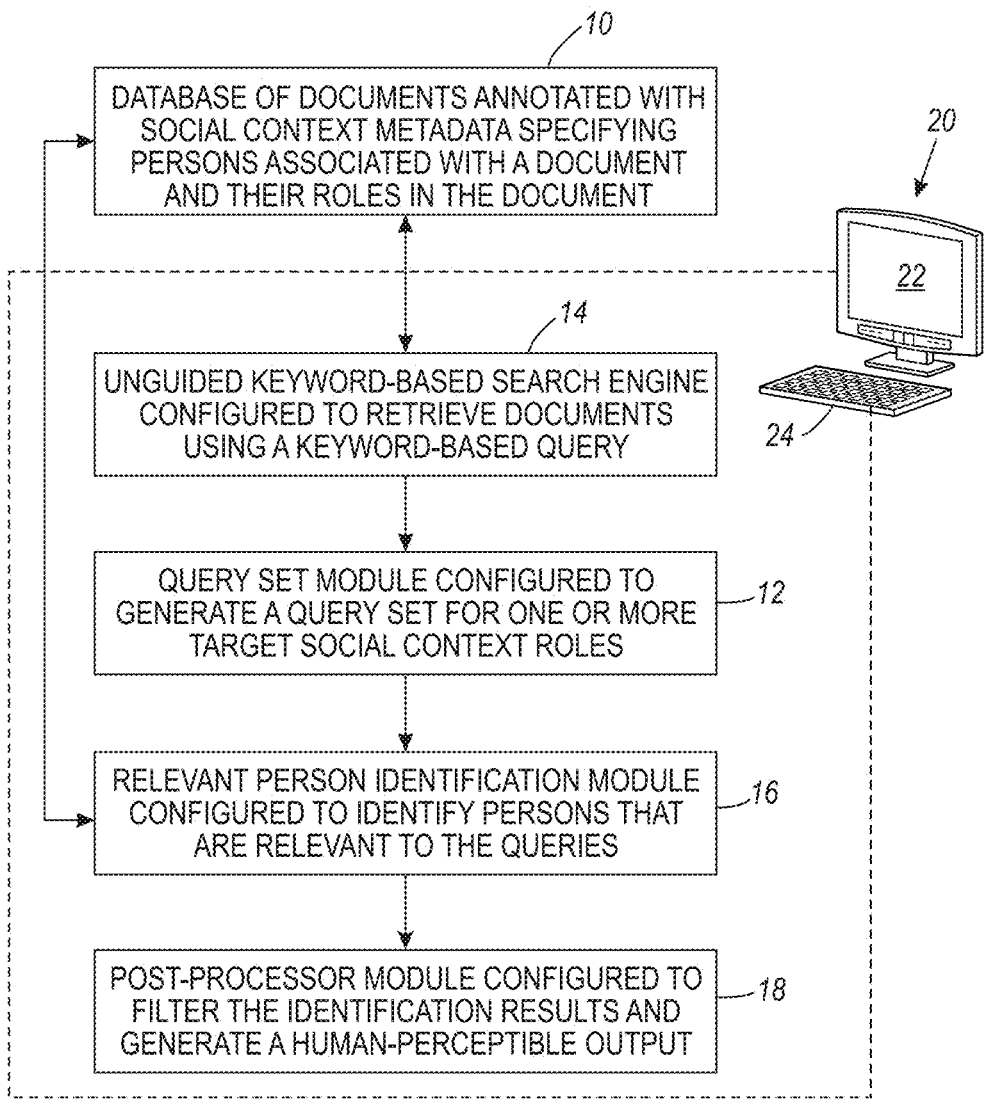
FIG. 1 diagrammatically shows a system for performing relevant person identification as disclosed herein.

With reference to FIG. 1, a relevant person identification system operates on a set of documents 10 annotated by metadata specifying persons associated with documents and their social context roles in the documents. In the illustrative example of FIG. 1, the set of documents 10 corresponds to an entire database; however, in some embodiments the set of documents 10 may be a sub-set of a database (or other larger document collection). A query set module 12 constructs, generates, or receives a set of queries respective to one or more target social context roles. The query set module 12 may be fully automatic, semi-automatic, or may be a user interface that passively receives the query (or set of queries) from a human user. In some embodiments, an "unguided" keyword search engine 14 is provided to perform keyword-based searching on the set of documents 10 to provide initial information for use in formulating the set of queries. The set of queries correspond to the same information need, namely identifying relevant persons. By way of illustrative example, consider a human resources application in which it is desired to fill an anticipated employment vacancy soon to be created by the retirement of a current scientist employee. In this case, the search engine 14 may be used to acquire a set of papers on which the current scientist employee is a (co-)author. Each paper may then serve as a "query document" from which a query is formulated. Since the goal is to locate a new hire having a similar skillset to that of the current scientist employee, it is reasonable to expect that the ideal new hire will have a publication record that is similar to that of the current scientist employee, and so each paper (co-)authored by the current scientist employee serves as a suitable basis for a query. Some further illustrative examples of query formulation are set forth herein with reference to FIGS. 4 and 5.

The set of queries formulated by the query set module 12 is input to a relevant persons identification module 16, which is configured to identify persons that are relevant to the queries. The disclosed relevant persons identification techniques employ enrichment techniques to expand the search beyond those results that would be obtained by keyword-based searching alone. Operation of the relevant persons identification module 16 is further described herein with reference to FIGS. 2 and 3. The output of the relevant persons identification module 16 is suitably processed by a post-processor module 18 that optionally filters or otherwise processes the identification results, and that generates a human-perceptible outout.

With continuing reference to FIG. 1, the processing components 12, 14, 16, 18 are suitably embodied by an electronic data processing device such as an illustrative computer 20, or a network-based server, or a mobile device such as a personal data assistant (PDA), smartphone, tablet computer, or so forth. The electronic processing device 20 includes a suitable output device, such as an illustrative display 22, for outputting the person identification results in a visual format or other human-perceptible format (e.g., a speaker could output the results in an audible format using speech synthesis). A user input device such as an illustrative keyboard 24, and/or a mouse, trackball, trackpad, or other pointing device, or so forth, is optionally provided to enable human user input to the system. For example, the keyboard 24 may be used to input the set of queries in embodiments in which the query set module 12 operates passively. In embodiments in which the query is constructed semi-automatically, the keyboard 24 or other input device may be used to input user-supplied parameters for constructing the queries. The database 10 may be located locally on (e.g., a hard drive of) the computer 10 or other electronic processing device, or may be located more remotely, for example accessed via the Internet, a corporate network, or so forth.

The disclosed persons identification techniques can also be embodied as a storage medium storing instructions executable by the electronic data processing device 10 to perform the disclosed persons identification techniques and, optionally, applications thereof. Such a storage medium may, for example, comprise a hard disk drive or other magnetic storage medium, or an optical disk or other optical storage medium, or a random access memory (RAM), read-only memory (ROM), flash memory, or other electronic storage medium, or so forth.

Without loss of generality, the following notation is used herein. A closed set of persons is denoted as the closed set P, indexed by p which takes its value in $\{1, \ldots, P\}$, where P is the total number of participants involved in the documents 10. A participant (i.e. person) can play different social context roles with respect to documents (author, recipient, commenter, follower, or so forth). The social context roles are denoted herein as the closed set R and are indexed by a variable denoted as r, with R possible roles so that r takes its value in $\{1, \ldots, R\}$. A document is represented by a term-document matrix denoted by X, an element X(i,j) of which contains a metric of the number or frequency of occurrences of word i in document j, optionally weighted, for example using a term frequency-inverse document frequency (TD-IDF) weighting scheme. The social context metadata associated with the documents are stored in matrices, denoted by $R_r$, whose element $R_r(i,j)$ is 1 when the participant i plays role r in document j (and 0 otherwise). So, there are as many $R_r$ matrices as there are possible roles. In the limiting case in which there is only one role (or, more realistically, in which the roles are not distinguished), the social context can be represented by a single R matrix whose element R(i,j) is 1 when person i is a participant of document j.

Generally, the user submits (or the query set module 12 constructs) a multi-faceted query (or query set) and targets persons who are participant in the documents of the collection, typically under some specific roles, called the target role(s). Without loss of generality, a set of queries denoted herein as Q consists of a set of K queries $q_k$ where $k=1, \ldots, K$. Each query $q_k$ is a triplet $(qx_k, qr_k^r, r_k')$ where $qx_k$ is a vector whose element $qx_k(i)$ is the number of occurrences of term i in the $k^{th}$ query; $qr_k^r$ is a vector whose element $qr_k^r(i)$ is 1 if person i plays a role r in the query $q_k$ (and 0 in the other cases); and $r_k'$ is the target social context role of the query $q_k$. Note that we assumed, for simplicity and clarity of the presentation, that each query $q_k$ associates key persons only for one role, but this can be readily extended to queries that span multiple roles (for instance, if one deals with email collection, the query could contain some key-persons associated with the social context role "To-recipient"' and other key-persons associated with the "Cc-recipient" role). Note that the target role $r_k'$ is in general different from the role of the key-persons $(qr_k^r)$ given in the query $q_k$. For example, when dealing with blogs, a user can give key-persons with a role of "commenter" and be interested in knowing who are the related persons with an "author" role, or vice-versa. The persons identification process suitably ranks each person of the set of documents 10 with respect to their relevance to all multi-faceted queries $q_k$ $(k=1, \ldots, K)$ of the set of queries Q, with each query $q_k$ being associated with a target role $r_k'$.

To illustrate the foregoing, consider the task of predicting the author of a new document. Suppose that the system has already indexed a base of documents in the same domain; these documents contain textual data (abstracts, full text, or so forth), and also have associated social context metadata identifying social context such as names of authors and authors of cited references. So, a person associated with a given document could have the role "is_author_of" or the role "is_cited_in". A single query q suffices in this case (i.e., k=1). The query q has the following facets: the words of the new document $(qx_k)$ and the persons cited in this document $(qr_k^r)$, where r refers here only to the "is_cited_in" role); the target role $r_k'$ is the "is_author_of" role, as the goal of this query is to identify the potential authors of the documents. If there are multiple authors, the query suitably has an additional facet which is the list of co-authors. One could also decide to not make the distinction between cited persons and co-authors and only use the neutral undirected "participate_in" role.

As another example, consider the task of recipient recommendation or, equivalently, the task of contextual citation proposal. In this case, the set of documents 10 is annotated with metadata representing social context information in a way that makes a distinction between the recipient (or citation) and author (or sender) roles. A suitable query has the following facets: the words of the new document $(qx_k)$ and the author of the document $(qr_k^r$, where r refers here only to the "is_author_of" social context role). If the new document already contains a partial list of citations (or recipients), the query has an extra facet which is the vector of cited persons. The target role $r_k'$ is the "is_cited_in" role (or "is_interested_in" role), as the interest is in the potential citations of the documents.

As another example, alias detection can be performed using the disclosed persons identification approach. The task here is to decide whether a person p associated to a set of K documents in which the person p participated coincides with any other person in the social context of the set of documents 10. One approach is to index the base of documents 10 by their standard textual content and by their participants (in other words, merging the active and passive roles as a single, undirected role, called "participates_in"). A set of queries Q suitably consists of the set of K documents with which person p was involved. Each query $q_k$ ($k=1, \ldots, K$) is a multi-faceted document with its textual content $(qx_k)$ and its participants $(qr_k^r$, where r designates the "participates_in" role). The target roles $r_k'$ are, in this case, identical to r, i.e. the "participates_in" role. Alternatively, the distinction between the active and passive roles can be made in the document metadata, and the alias prediction problem can be constructed as the superposition of an author prediction task and a recipient prediction task. In this case, there will be queries containing key-persons playing an active role (for example, "is_author_of") and queries with key-persons playing a passive role ("is_follower_of", "is_recipient_of", or so forth). The queries with active key-persons are associated to a passive target role $r_k'$, while the queries with passive key-persons are associated to an active target role $r_k'$.

To generalize, the queries $q_k$ of the set of queries $Q=\{q_k\}$, $k=1, \ldots, K$ should correspond to the same unique information need, namely identifying relevant persons. In the case of a task in which it is desired to find persons "similar to" a known "target" person, one suitable approach for generating the set of queries Q all corresponding to the same unique information need of finding persons similar to the target person is to define each query $q_k$ by a document in which the target person fills the target role $r_k'$. Then if a (different) person fills the target role $r_k'$ in a document that is similar to the "query" document defining the query $q_k$, this tends to indicate that the (different) person is a relevant person, that is, is similar to the target person. For example, in a human resources problem in which it is desired to find a replacement for a certain researcher (who is thus the "target researcher"), the queries $q_k$ can be constructed from documents (e.g., technical papers and the like) in which the target researcher fills the target role $r_k'$. The target role $r_k'$ may, in general, be different for each $q_k$—for example, one query may be generated from a paper in which the target researcher was an author (so that $r_k'$ the author role) while another query may be generated from a paper in which the target researcher was the journal editor (so that $r_k'$ is the editor role). As another example, in an email alias identification task the email for which aliases are to be found serves as the "target email address". Then, emails sent from the target email address serve as one set of queries (with target role $r_k'$ being "sender") and emails received by the target email address serve as another set of queries (with target role $r_k'$ being "recipient").

It should be noted that in the information retrieval field the set of queries Q all corresponding to the same unique information need is sometimes referred to by the singular "query" while the constituent queries $q_k$ are referred to as "sub-queries". However, herein the notation of a "set of queries" Q made up of constituent queries $q_k$ (all corresponding to the same unique information need, i.e. the relevant persons identification task) is employed.

Figure 2:
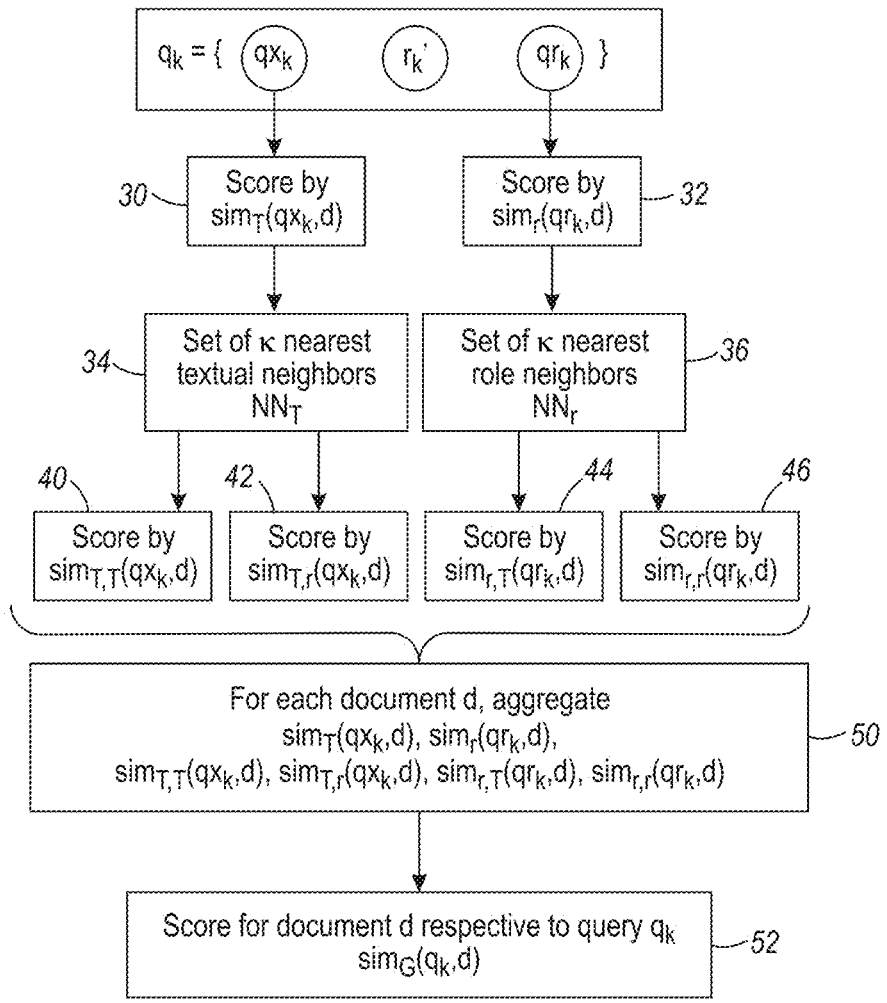
FIGS. 2 and 3 diagrammatically show a flow chart of processing suitably performed by the computer of FIG. 1 implementing the relevant person identification module of the system of FIG. 1.
Figure 3:
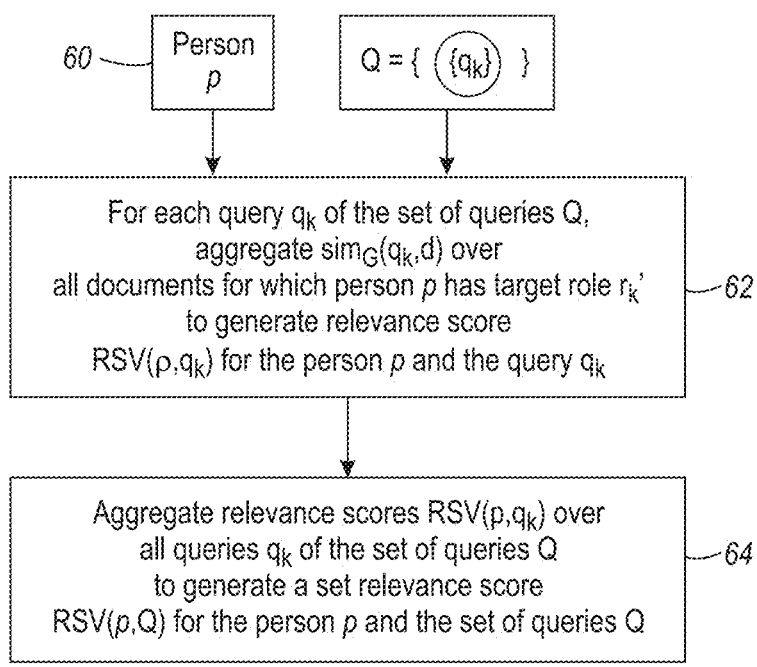

With reference to FIGS. 2 and 3, operation of some illustrative embodiments of the relevant persons identification module 16 is described. The set of documents 10 is represented here by X, with annotations represented by $R_r$. A set of queries Q={$q_k$}, k=1, ..., K is to be applied. Note, in some instances it may be the case that k=1, i.e. the set of queries Q constitutes a single query. FIG. 2 addresses the application of one query $q_k$ which is represented by a set of triplets (q$x_k$, q$r_k^r$, $r_k'$) where the subscripts r and k designate role and query indices respectively while $r_k$, is the target role of query $q_k$. It is desired to compute a relevance score RSV(p,Q) that measures how well person p is relevant to query Q. The method involves two phases. In the first phase, multi-modal similarities between the query $q_k$ and the documents of the document collection 10 are computed. In the second phase, these similarities are aggregated in order to go from documents to persons (by a weighted average of the similarities with the documents for which the persons play the target role $r_k'$) and from query $q_k$ to the set of queries Q (by aggregating the queries $q_k$,k=1, ..., K, an operation that is suitably omitted if K=1).

For the first phase, two types of similarities are defined: one-step similarities, and two-step (or enrichment) similarities. The one-step similarities are mono-modal similarities. The two-step similarities are reminiscent of so-called "transmedia feedback" mechanisms such as are used to provide pseudo-relevance feedback in some enriched multimedia document retrieval approaches. See, e.g. Clinchant et al., "Transmedia pseudo-relevance feedback methods in multimedia retrieval", in *CLEF* pages 569-76 (2007); Mensink et al., "Trans-media relevance feedback for image autoannotation", in *Proceedings of British Machine Vision Conference, BMVC* 2010, Aberystwyth, UK, Aug. 31-Sep. 3, 2010, pages 1-12. The approach starts by applying a mono-modal similarity measure 30 to compute a score for content query portion q$x_k$ and a document d of the set of documents 10. Typically, the score is a similarity measure comparing the document with content (e.g., keywords or text in the case of textual content) specified by the content query portion. In examples herein the content is assumed to be textual content, although other types of content (e.g., images, audio clips, or so forth) are also contemplated. In an illustrative example, the Language Modelling (LM) approach to Information Retrieval with Jelinek-Mercer smoothing (Zhai et al., "A study of smoothing methods for language models applied to ad hoc information retrieval", in *Proceedings of the 24th Annual International ACM SIGIR Conference on Research and Development in Information Retrieval*, Sep. 9-13, 2001, New Orleans, La., USA, pages 334-42) served as basis in order to define these (asymmetric) similarity measures, and in particular the query log-likelihood criterion. When the textual content is considered, the similarity based on the query log-likelihood criterion can suitably be computed as:

$$sim_T(q_k, d) = \sum_w qx_k(w) \log\left(1 + \frac{\lambda_T}{1-\lambda_T} \frac{x(w,d)}{p(w) \cdot L(d)}\right), \quad (1)$$

where w is an index over the words of the vocabulary, $\lambda_T$ is the smoothing factor used in the Jelinek-Mercer LM smoothing strategy, p(w) is the collection-based prior probability of word w (number of occurrences of w in the whole collection, divided by the total number of words in the collection) and L(d) is the length (in words) of document d. Extension to multiple content modalities is straightforward. For example, if the documents include both text and images, then the content query portion q$x_k$ may be represented by text and image content query portions, e.g. q$x_k$={q$x_{t,k}$,q$x_{i,k}$} where q$x_{t,k}$ is the textual content query portion (equivalent to q$x_k$ in Equation (1)) and q$x_{i,k}$ is the image content query portion suitably represented by an image features vector containing values of image features. Two corresponding content similarity measures would be computed, e.g. $sim_T$(q$_{t,k}$,d) computed as per Equation (1) and $sim_i$(q$_{i,k}$,d) computed using a suitable image features vector comparison function. Similarly, for a social role r, a suitable asymmetric similarity measure is:

$$sim_r(q_k, d) = \sum_p qr_k^r(p) \log\left(1 + \frac{\lambda_r}{1-\lambda_r} \frac{R_r(p,d)}{p_r(p) \cdot L_r(d)}\right), \quad (2)$$

where p is an index over the participants, $\lambda_r$ is the smoothing factor used in the Jelinek-Mercer LM smoothing strategy, $p_r(p)$ is the collection-based prior probability of person p in role r (number of times that p plays role r in the whole collection, divided by the total number of times that any person plays this role in the collection) and $L_r(d)$ is the number of persons playing role r in document d. Analogously to the content query portion, it is contemplated to extend the social context query portion to include two or more roles, e.g. {q$r_k^{r1}$, q$r_k^{r2}$} in which case a similarity measure according to Equation (2) is computed for each social role.

With continuing reference to FIG. 2, the two-step similarity measures are defined in this framework as well. For clarity of the presentation, it is assumed that there is only content modality (e.g., text) and only one social context role r of interest, so that only two views are combined. This is readily generalized to two or more content modes (e.g., text and images) and/or two or more different social context roles (e.g., email sender and email recipient). In the illustrative example with two views (textual content and the single social context role r), a set of nearest neighbor documents 34 is selected from the set of documents 10 based on the content-based scores $sim_T$(q$_k$, d) 30, and a set of nearest neighbor documents 36 is selected from the set of documents 10 based on the social context-based scores $sim_r$(q$_k$, d) 32. For the two views, up to four different two-step similarity measures can be defined, namely $sim_{T,T}$(q$_k$,d) 40, $sim_{T,r}$(q$_k$,d) 42, $sim_{r,T}$(q$_k$, d) 44, and $sim_{r,r}$(q$_k$, d) 46, given respectively by:

$$sim_{T,T}(q_k,d) = \Sigma_{d' \in NN_T} sim_T(q_k,d') sim_T(d',d) \quad (3),$$

$$sim_{r,r}(q_k,d) = \Sigma_{d' \in NN_r} sim_r(q_k,d') sim_r(d',d) \quad (4),$$

$$sim_{T,r}(q_k,d) = \Sigma_{d' \in NN_T} sim_T(q_k,d') sim_r(d',d) \quad (5),$$

$$sim_{r,T}(q_k,d) = \Sigma_{d' \in NN_r} sim_r(q_k,d') sim_T(d',d) \quad (6),$$

where $NN_T$ designates the set of K nearest neighbors 34 of $q_k$ using the (mono-modal) textual similarities, and $NN_r$ designates the set of K nearest neighbors 36 of $q_k$ using (mono-modal) social context similarities. A suitable value of K is typically between 3 and 20 although larger or smaller values are contemplated. The value of K can, in general, be different for each mode.

With continuing reference to FIG. 2, the similarity measures 30, 32, 40, 42, 44, 46 are suitably aggregated in an operation 50 to form a query score $sim_G(q_k,d)$ 52 for the query $q_k$. The aggregation operation 50 can employ averaging, summation, or another suitable aggregation operation, and can employ various weights for the various constituent similarity measures or scores 30, 32, 40, 42, 44, 46. In the illustrative example, a weighted average is used, such that:

$$sim_G(q_k,d) = \alpha_T sim_T(q_k,d) + \alpha_r sim_r(q_k,d) + \alpha_{TT} sim_{T,T}(q_k,d) + \alpha_{r,r} sim_{r,r}(q_k,d) + \alpha_{rT} sim_{r,T}(q_k,d) + \alpha_{T,r} sim_{T,r}(q_k,d) \quad (7),$$

where the $\alpha$ factors are the weights. These weights can be chosen in various ways. In one suitable approach, an equal weight is given to each contribution (so, the global similarity is the simple mean of the individual similarities), after studentization of the similarities (i.e. before combining the scores, for each type of similarity, the mean of the scores over the documents is removed and the difference is divided by the standard deviation of the scores over the documents). In another suitable approach, optimal weights are learned in order to maximize a utility function, such as a normalized discounted cumulated gain at rank 10, or NDCG@10, for a set of training queries with their corresponding relevance judgements. For instance, for the author prediction task, this may be achieved by considering sequentially each document of the collection as the query (like in a "leave-one-out" approach to learn parameters while avoiding overfitting), hiding (virtually) its author information and trying to retrieve it—from the (weighted) similarities with respect to all other documents in the collection and their corresponding labels (i.e. known authors). Considering this as a binary classification problem, a sparse logistic regression algorithm can be used to solve this learning problem and the learned model can be applied to combine the individual similarity measures. In experiments performed by the inventors, the learned $\alpha_i$ values achieved results very similar to the simple mean operator applied to the studentized scores. Without being limited to any particular theory of operation, it is believed that the optimum of this problem is quite "flat", such that fine-tuning of the weights is not especially beneficial. Accordingly, it is expected that it is generally not worthwhile to learn the weights of the weighted average (or summation, or other aggregation) by logistic regression, as the designed similarity measures offer the nice property that the best combination is a flat optimum around the simple average solution With reference now to FIG. 3, the second phase of the method is performed. This entails conversion from document similarities $sim_G(q_k,d)$ 52 to relevance metrics indicative of relevance of a person p 60 to the query $q_k$ in an operation 62, and the aggregation of the these "per query" relevance metrics over all queries (for K>1) in an operation 64. In the first operation 62, the query scores $sim_G(q_k,d)$ 52 for each query $q_k$ are converted to a relevance value (or relevance score) RSV $(p,q_k)$ by aggregating the query scores $sim_G(q_k,d)$ 52 over all documents for which the person p 60 has the target role $r_k'$. In the second operation 64, these relevance values RSV$(p,q_k)$ are aggregated into a final relevance score RSV$(p,Q)$ with respect to the set of queries Q={$q_k$}, k=1, . . . , K and the set of target roles $r_k'$. (Again, if K=1 then RSV$(p,Q)$=RSV$(p,q_1)$ and operation 64 can be omitted). The final relevance score RSV$(p,Q)$ is sometimes referred to herein as the set relevance score. It will be appreciated that the operations 62, 64 are optionally combined, for example using a double-summation to perform the sum over documents for which person p 60 has the target role 71, and the sum over the K queries.

As there is no prior information giving more importance to one query versus another, the contributions coming from each query in the aggregation operation 64 are suitably summed or averaged with equal weights. Conversely, different weights can be used for different queries if there is a reason to do so. For example, when aggregating documents into person profiles that play the target role $r_k'$ with respect to them, it is contemplated to give less importance to documents in which more persons were involved with the role $r_k'$. For example, in one approach the documents are weighted by the inverse of $L_{r_k'}(d)$. In experiments performed by the inventors, this weighting scheme always gave better performance than using the simple sum (or simple mean) with equal weights. Using this weighting scheme and combining the operations 62, 64 as a double-summation, the second phase can be expressed as:

$$RSV(p,Q) = \sum_k \sum_{d|p \in r_k'(d)} \frac{sim_G(q_k,d)}{L_{r_k'}(d)}, \quad (8)$$

where $r_k'(d)$ denotes the set of persons playing the role $r_k'$ in document d.

Figure 4:
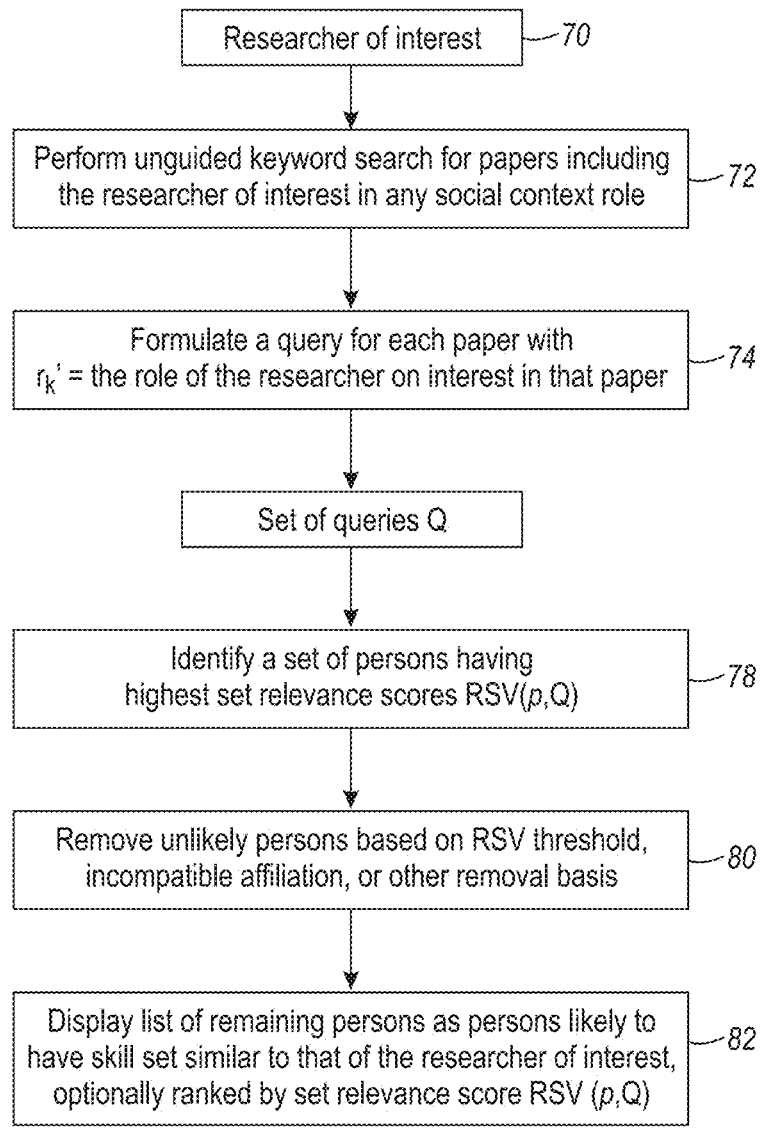
FIG. 4 diagrammatically shows a skilled candidate identification method suitably performed using the system of FIG. 1.

With reference to FIG. 4, application of the relevant persons identification system described with reference to FIGS. 1-3 to a human resources problem, namely the identification of a researcher having a skill set corresponding to a researcher of interest (for example, a current research employee who is retiring and will need to be replaced) is described. In this example the set of documents 10 (see FIG. 1) is a scientific papers repository in which the papers are annotated at least by author, and preferably by additional social context roles such as journal editor. A researcher of interest 70 (for example, the retiring research employee) serves as a basis for generating queries. Toward this end, in an operation 72 the unguided keyword-based search engine 14 (see FIG. 1) is applied to identify papers for which the researcher 70 has some role (e.g., author, editor, or so forth). In an operation 74 these papers are used to formulate the set of queries Q. In a suitable approach, each paper serves as the basis of a corresponding query—thus, there are Q={$q_k$}, k=1, . . . , K queries where K is the number of papers retrieved in the operation 72. For each query $q_k$ represented by the triplet ($qx_k$, $qr_k^r$, $r_k'$), the content query portion $qx_k$ is defined by the textual content of the paper, the target social context role $r_k'$ is the role that the researcher 70 of interest played in the paper, and the social context query portion $qr_k^r$ is given by the remaining social context metadata (that is, the social context metadata other than the designation of the researcher 70 as filling the target role $r_k'$). In an operation 78, the relevant persons identification module 16 (see FIG. 1) operates as described herein with reference to FIGS. 2 and 3 to identify relevant persons as those persons having the highest set relevance score RSV$(p,Q)$. Note that the operations 62, 64 of FIG. 3 are suitably repeated for each person of a set of persons of interest (that is, with each person in turn filling the role of the person p 60) in order to generate set relevance scores RSV$(p,Q)$ for all persons of the set of persons of interest. The set of persons of interest may, for example, be all persons associated with at least one document of the set of documents 10. Alternatively, the set of persons of interest may be a sub-set of all persons associated with at least one document, for example the sub-set left after filtering out persons who do not meet certain readily ascertained qualifications such as educational level. In an operation 80, the post-processor module 18 (see FIG. 1) is optionally applied to remove unlikely persons based on a threshold for the RSV values or based on other information. (In this human resources example, such "other information" might, for example, include removing a person if they do not meet certain mandatory qualification requirements such as a minimum age requirement or a minimum education requirement.) In an operation 82, the remaining persons with the highest RSV scores are listed, optionally ranked by RSV score. Optionally, the displayed results may include only a selected sub-set of persons from the set of persons of interest who have the highest set relevance scores.

Figure 5:
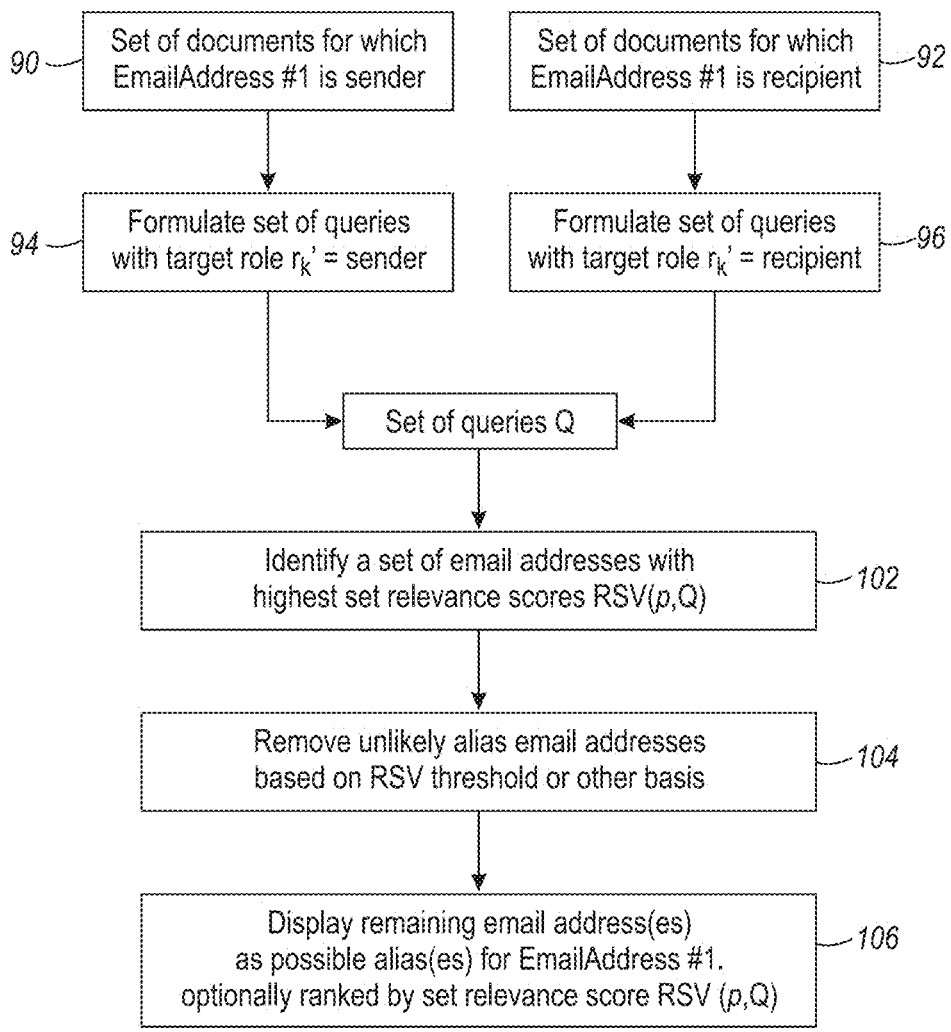
FIG. 5 diagrammatically shows an email alias identification method suitably performed using the system of FIG. 1.

With reference to FIG. 5, application of the relevant persons identification system described with reference to FIGS. 1-3 to an email alias detection problem is described. In this problem, the input is a known email address, i.e. "EmailAddress #1", which is known to belong to a certain physical person. It is desired to determine whether there is some other email address, i.e. an alias email address, that also belongs to the same physical person. Toward this end, the system is provided with a set of email documents 90 for which EmailAddress #1 is the sender, and another set of email documents 92 for which EmailAddress #1 is the recipient (or is one of multiple recipients). An operation 94 uses the set of email documents 90 for which EmailAddress #1 is the sender to formulate a set of queries for which the target role $r_k'$ is the email sender. Similarly, an operation 96 uses the set of email documents 92 for which EmailAddress #1 is a recipient to formulate a set of queries for which the target role 71, is an email recipient. The queries generated by the operations 94, 96 are combined to form the set of queries Q. In an operation 102, the relevant persons identification module 16 (see FIG. 1) operates as described herein with reference to FIGS. 2 and 3 to identify relevant persons as those persons having the highest set relevance score RSV(p,Q). Again, the operations 62, 64 of FIG. 3 are suitably repeated for each person of a set of persons of interest (that is, with each person in turn filling the role of the person p 60) in order to generate set relevance scores RSV(p,Q) for all persons of the set of persons of interest. Here the set of documents 10 is suitably a set of emails, and the set of persons of interest suitably includes all email addresses associated (as either sender or recipient) with the set of emails 10. In an operation 104, the post-processor module 18 (see FIG. 1) is optionally applied to remove unlikely persons based on a threshold for the RSV values or based on other information. (In this email alias detection example, such "other information" might, for example, include removing email addresses whose domain rules out the email address as a possible alias). Another contemplated post-processor operation is to adjust ranking scores RSV(p, Q) based on other available information. For example, in the application of finding email aliases the post-processing may adjust a score based on an approximate string matching (ASM) distance between the known email address and the possible alias email address. The rationale for this is that, by way of illustration, the email address John.Smith@Denver.acmeco.com is (more) likely to be an alias of John.Smith@acmeco.com since the strings representing the addresses have an (ad-hoc) edit distance which is relatively low. Thus, the score for possible alias John.Smith@Denveracmeco.com is suitably adjusted upward. In an operation 106, the remaining email addresses with the highest RSV scores are listed, optionally ranked by RSV score. Optionally, the displayed results may include only a selected sub-set of email addresses from the set of persons of interest who have the highest set relevance scores.

FIGS. 2 and 3 illustrate processing suitably performed by the relevant person identification module of the system of FIG. 1 to compute a relevance score RSV(p,Q) for a person p respective to a set of queries Q={$q_k$}, k=1, . . . , K. In this example, each query $q_k$ is enriched respective to textual content and respective to social context (operations 30, 32, 40, 42, 44, 46 of FIG. 2) to generate query enrichment (or query expansion) scores including the similarity measures $sim_{T,T}(q_k,d)$, $sim_{T,r}(q_k,d)$, $sim_{r,T}(q_k,d)$, and $sim_{r,r}(q_k,d)$. Thereafter, the enrichment scores for the various modalities are aggregated for each document (operation 50 of FIG. 2) to generate document scores $sim_G(q_k,d)$ for the query $q_k$. The document scores are aggregated over all documents for which the person p has the target role $r_k'$ (operation 62 of FIG. 3) to generate a relevance score RSV(p,$q_k$) for the person p respective to the query $q_k$. Finally, the relevance scores for the queries are aggregated over the K queries (operation 64 of FIG. 3) to generate the final relevance score RSV(p,Q) for the person p.

However, the example of FIGS. 2 and 3 is merely one illustrative enrichment and aggregation sequence that may be used to leverage the textual and social data to provide more probative relevance scores for persons respective to a set of queries. Numerous other sequences can be employed. For example, rather than performing query enrichment (in which the query is enriched by nearest-neighbor feedback mechanisms), one can instead (or additionally) perform document enrichment (in which the document is enriched by nearest-neighbor feedback mechanisms). The ordering of the enrichment and aggregation operations can also be varied. In the example of FIGS. 2 and 3 the query enrichment was performed first (without any document enrichment), followed by aggregation over the modalities (operation 50), aggregation over the documents (operation 62), and aggregation over the queries (operation 64). More generally, however, the aggregation operations could be performed before performing the enrichment. If both query enrichment or expansion and document enrichment or expansion is performed, then this introduces further sequence variational possibilities.

The following provides a framework for a generalized computation of relevance scores.

The relevance scores to be computed employ information mined from a socially-annotated collection having a set of P persons as participants. The relevance score RSV(p,Q) of a person p to a set of queries Q={$q_k$}, k=1, . . . , K is to be computed. This relevance score may then be used for further exploitation such as filtering, ranking, or so forth. (Two illustrative applications are described herein with reference to FIGS. 4 and 5). There are M+1 representation modes (or views). As used herein, the mode m=0 (i.e. mode T in FIG. 2) corresponds to the textual view, while modes m>0 correspond to possible social roles such as "is author of", "is cited by", "is commented by", or so forth. (In FIG. 2 these modes are generically denoted by r). The socially annotated collection can then be represented by M+1 matrices, denoted as $X^{(m)}$, of size $n_d \times n_f^{(m)}$, where $n_d$ is the number of documents in the considered collection and $n_f^{(m)}$ is the number of features for the view m. We can also define a global matrix X which is the concatenation of all $X^{(m)}$ matrices, that is, $X=[X^{(0)} X^{(1)} \ldots X^{(M)}]$. The notation $x^d$ designates the row d of this global matrix X and corresponds to the multi-modal vectorial representation of the document d. Note that, typically, the elements of the matrix are not simply the number of occurrences of a feature in the document, but a weighted version where this number of occurrences is modified in order to take into account the importance of the feature (for example, textual features may be represented using a term frequency-inverse document frequency, tf-idf, weighting scheme) and the document length or the number of features in the document view (for example, using a length normalization as in standard information retrieval). The set of queries Q comprises K queries $q_k$, with each query being associated to a target social role. The set of queries Q is therefore represented by a set of tuples set of queries $<q^k, r_k'>$ where set of queries where $k \in [1, \ldots, K]$ and $r_k' \in \mathcal{R}$ designates the target social role associated to the $k^{th}$ query. The possible target social roles are, in general, the possible social roles, so that the set $\mathcal{R}$ is indexed from 1 to M. Each query $q^k$ may in general include M+1 views (or modes), some of which could be empty. In other words, $q^k = [q^{k,(0)} q^{k,(1)} \ldots q^{k,(m)} \ldots q^{k,(M)}]$, where $q^{k,(m)}$ is a row vector of size $n_f^{(m)}$, that is, the size of the feature space of the mode m.

The (generalized) computation of the relevance scores is a sequence of object (or query) comparison operations and aggregation operations. The aggregation operations are along the following dimensions: (1) aggregating from constituent queries $q_k$ to the set of queries Q; (2) aggregating from documents to persons; (3) aggregating the different modes (or views); and (4) aggregating the different modes of expansion (or enrichment). The following types of actions are performed: comparing two objects in a given mode m; aggregating multiple objects (or similarity measures) to generate an aggregate object (or similarity measure); and enriching an object through mode m'. These action types are addressed in turn.

The first action type is comparing two objects in a given mode m (in other words, computing a similarity measure between two objects). This operator is denoted herein as $\mathcal{C}^{(m)}(o_1, o_2)$. This operator acts on two multi-modal objects $o_1$ and $o_2$ by only considering the sub-vectors that corresponds to the $m^{th}$ mode. Some suitable comparison measures include the standard cosine similarity, any standard kernel function on textual data, language-model based similarities, or so forth. The output of a comparison $\mathcal{C}^{(m)}(o_1, o_2)$ is a scalar value indicative of the similarity (or distance) of the two objects $o_1, o_2$.

The second action type is aggregation. The operation aggregates multiple objects (or multiple comparison measures) into a single object (or single comparison measure). Aggregation is typically done by a weighted sum or a weighted average (of vectors or of scalars) but other, more elaborate fusion operators are also contemplated, or example when acting on similarity measures (e.g. soft-max or soft-min operators, as illustrative examples). The aggregation operator is denoted herein as the symbol $\oplus_i$ where the subscript i indicates on which index the aggregation is performed. The $\oplus_i$ symbol can be considered as a generalization of the standard $\Sigma_i \ldots$ notation. The output of an aggregation depends upon the input. If objects are aggregated, then the output is an object. If the comparison scores are aggregated, then the output is a scalar value.

The third action type is enrichment (also called expansion herein). An object o is enriched through mode m' (starting from a query or from a document of the collection). The enrichment operator is denoted herein as $\epsilon^{(m')}(o)$. Enrichment acts on the multimodal object o and providing a new, enriched multimodal object o'. The enrichment operator is actually the combination of a "compare" operator $\mathcal{C}^{(m')}$ in mode m' (between the object o and every document of the collection), followed by an aggregation operator applied on the nearest neighbors derived from this comparison step. The output of the enrichment $\epsilon^{(m')}(o)$ is the enriched object o'.

As far as the aggregation operator $\oplus_i$ is concerned, the possible indices i over which the aggregation may be performed include: k (index over queries, running from 1 ... K unless another range is specified; d (index over documents, running from 1 ... $n_d$ unless another range is specified); m (index over different modes used for computing the comparisons between two objects, running from 0, ..., M unless another range is specified); m' (index over different modes of expansion, running from 0, ..., M unless another range is specified; and r' (index over the different distinct target roles, running from 0, ..., M unless another range is specified.

Also defined herein is a "meta-aggregation" operator, which aggregates over all possible ways (sequences of operators) of generating a (scalar) global relevance score RSV(p,Q) for person p and a set of queries Q. A finite number of such sequences exist, which can theoretically be combined by any score fusion mechanism. Each distinct sequence (or way) of generating a relevance score is denoted $R_\omega(p,Q)$ where the index $\omega$ indexes the various distinct sequences (or ways). Since the output of a scoring sequence $R_\omega(p,Q)$ must be a scalar, the scoring sequence $R_\omega(p,Q)$ must include a comparison operator $\mathcal{C}^{(\cdots)}$. In a valid scoring sequence, the query (k) and document (d) indices are typically constrained by the choice of target role (r') and by the person p whose relevance is being scored. Typically, for assessing the relevance of person p, if a particular target role r' is considered, then the aggregation of interest is over the queries that are associated with this particular target role (that is, k is aggregated over the set of values such that $r_k' = r'$, denoted as $\oplus_k^{r'}$). Similarly, the aggregation of interest is over the documents in which the person p plays the target role r' (that is, d is aggregated over the set of values such that person p plays the role r' in d, denoted as $\oplus_d^{r'}$).

Assuming that enrichment can be done both at the document and query levels, the other degrees of freedom in designing a valid sequence of operators to constitute a valid relevance score sequence $R_\omega(p,Q)$ rely on the options to aggregate over the various indices k, d, and m'. The aggregation can be done either before or after the "comparison" operator transforms objects into scores. In order to clarify the presentation of possible valid sequences, it is also assumed herein that multiple aggregation operators forming a contiguous sub-sequence are permutable; for instance $\oplus_i \oplus_j \oplus_k = \oplus_i \oplus_k \oplus_j = \oplus_k \oplus_j \oplus_i = \oplus_k \oplus_i \oplus_j = \oplus_j \oplus_i \oplus_k = \oplus_j \oplus_k \oplus_i$ for all indices i, j, k.

In principle, the enrichment operator could be applied more than one time, for instance to derive a double-step expansion of an object. However, it is expected that one enrichment step is likely to be sufficient, and that it is not necessary to go towards the multi-step expansion. Thus, the various distinct relevance scoring sequences (or ways) $R_\omega(p,Q)$ set forth herein each include zero or one query enrichment operator $\epsilon^{(m'')}$ and zero or one document enrichment operator $\epsilon^{(m')}$. This assumption could be relaxed. In the notation employed herein, this would entail introducing extra indices and extra aggregation steps.

The foregoing framework for constructing a relevance score sequences $R_\omega(p,Q)$ can be viewed as a type of grammar. Various relevance score sequences $R_{107}(p,Q)$ can be constructed by combining a comparison $\mathcal{C}^{(\cdots)}$, zero or one enrichment $\epsilon^{(\cdots)}$, and aggregation $\oplus_i$ over the various indices in accordance with the grammatical rules (e.g., permutability of the aggregation operators $\oplus_i$, the specified inputs and outputs of the various operators $\oplus_i$ (objects in/object out or scores in/score out), comparison $\mathcal{C}^{(\cdots)}$ (two objects in/one score out), and enrichment (object in/object out).

Figure 7:
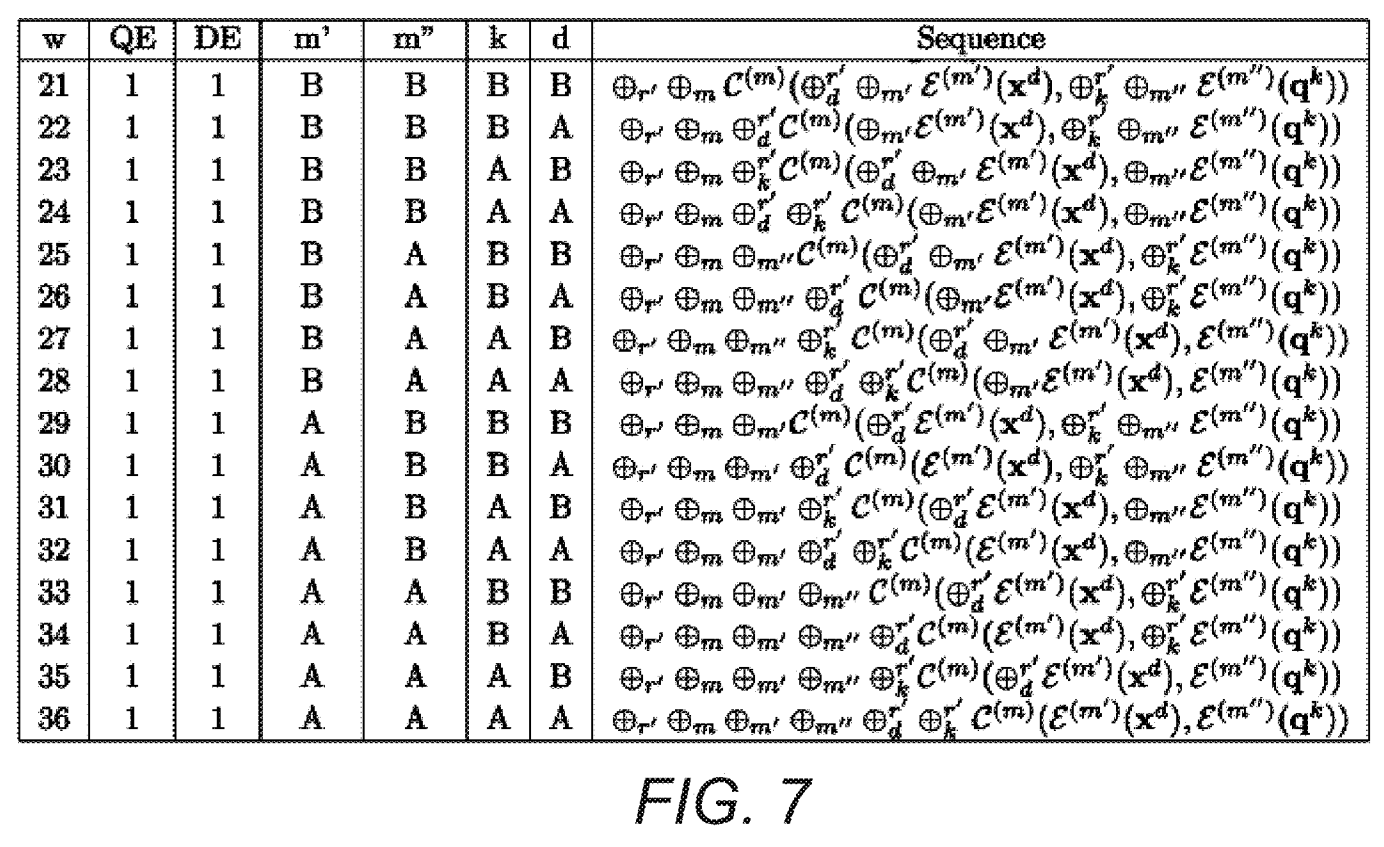

FIGS. 6 and 7 provide a table of all possible relevance scoring sequences $R_\omega(p,Q)$ complying with the grammar. Each scoring sequence (or way) $R_\omega(p,Q)$ is obtained by assigning each degree of freedom to one of its possible values. The values of the "QE" (i.e. "Query Enrichment") and "DE" (i.e., "Document Enrichment") columns indicate whether enrichment is done at the query level and document level respectively. The columns headed "m'" and "m''" indicate whether the aggregation over the expansion modes (m' for the document, m'' for the query, as both types of enrichment are allowed in a single sequence $R_\omega(p,Q)$) is done before (B) or after (A) the comparison (similarity computation) operator. Similarly, the columns headed "k" and "d" indicate respectively whether the $\oplus_k^{r'}$ and $\oplus_d^{r'}$ operators, respectively, are applied before or after the similarity computation step. It will be appreciated that all aggregation steps performed before the comparison operator act on multi-modal vectors, while an aggregation step performed after the comparison acts on similarity measures (which are scalars). The last column of the table of FIGS. 6 and 7 explicitly gives the mathematical formula of the relevance scoring sequence (or way). Considering the various permutations, there are thirty-six possible scoring sequences $R_\omega(p,Q)$ set forth in the table of FIGS. 6 and 7.

In the table presented in FIGS. 6 and 7, the relevance scoring sequences indexed by $\omega \in \{1,2,3,4\}$ do not employ any enrichment, and accordingly do not include any enrichment $\epsilon^{(\cdots)}$ operators. (Thus, the relevance scoring sequences that include enrichment are the relevance scoring sequences $R_\omega(p,Q)$ of FIGS. 6, 7, and 8 wherein $\omega \notin \{1,2,3,4\}$). The relevance scoring sequences indexed by $\omega \in \{5,\ldots,12\}$ employ only query enrichment and include only $\epsilon^{(m'')}$ operators. The relevance scoring sequences indexed by $\omega \in \{13,\ldots,20\}$ employ only document enrichment and include only $\epsilon^{(m')}$ operators. Finally, the relevance scoring sequences indexed by $\omega \in \{21,\ldots,36\}$ employ both query enrichment and document enrichment, and accordingly include both $\epsilon^{(m')}$ and $\epsilon^{(m'')}$ operators. The illustrative example presented in FIGS. 2 and 3 herein corresponds to the relevance scoring sequence $R_{12}(p,Q)$ (that is, to the relevance scoring sequence indexed by $\omega=12$). However, the relevance scoring sequence $R_{12}(p,Q)$ in the table in FIG. 6 is:

$$R_{12}(p,Q) = \oplus_r \oplus_m \oplus_m \oplus_d{}^{r'} \oplus_k{}^{r'} C^{(m)}(x^d, \epsilon^{(m'')}(q^k)) \quad (9)$$

whereas the implementation shown in FIGS. 2 and 3 is:

$$R_{12}(p,Q) = [\oplus_r \oplus_k{}^{r'}] \oplus_d{}^{r'} [\oplus_m \oplus_{m'}] C^{(m)}(x^d, \epsilon^{(m'')}(q^k)) \quad (10)$$

where the operation $C^{(m)}(x^d, \epsilon^{(m'')}(q^k))$ corresponds to the comparison (i.e., scoring) and enrichment operations 30, 32, 40, 42, 44, 46 of FIG. 2, the aggregation $[\oplus_m \oplus_{m'}]$ corresponds to operation 50 of FIG. 2 (aggregating over similarity computation modes m and enrichment modes m'), the aggregation $\oplus_d{}^{r'}$ corresponds to operation 62 of FIG. 3 (aggregating over all documents d for which the person p play role r'), and the aggregation $[\oplus_r \oplus_k{}^{r'}]$ corresponds to operation 64 of FIG. 3 (aggregating over all queries $q_k$ of the set of queries Q). Under the assumption that multiple aggregation operators forming a contiguous sub-sequence are permutable, the formulations (9) and (10) are equivalent.

With reference to FIG. 8, additional degrees of freedom can be added by allowing enrichment to be performed on aggregate objects. In this case the meta-aggregation operators indexed by $\omega \in \{5, 6,9,10,13,15,17,19,22,23,26,27,30,31,34,35\}$ each have an alternative (called "bis" in the left column of the table of FIG. 8) formulation given in the table of FIG. 8. Further, the meta-aggregation operators indexed by $\omega \in \{21, 25,29,33\}$ each have three possible alternative formulations (called bis, ter, and quarter in the left column of the table of FIG. 8). This provides twenty-eight additional meta-operators listed in the table of FIG. 8. In total, therefore, there are sixty-four meta-aggregation operators listed in the tables of FIGS. 6-8. However, if k=1 then some possibilities collapse as there is only one target role r' and only one query.

Various strategies can be used to select the aggregation ($\oplus$) operators, especially when weights are used in the aggregation. One strategy is to choose the weights as follows. The weights used for aggregating over the indices k and r' are fixed to 1 (uniform). The weights used for aggregating over the indices d (such that person p plays role r' in d: $\oplus_d{}^{r'}$) are fixed to the inverse of the number of persons playing the same role r' in document d. The other weights (for $\oplus_m$, $\oplus_{m'}$, $\oplus_{m''}$) are binary (either 0 or 1) and are chosen by taking the best combination of (0/1) values on a set of training queries with annotated relevance judgments. This strategy substantially reduces the search space while giving good performance that is comparable with more elaborate learning strategies (such as "learning to rank" methods) that endeavor to optimize continuous values of all the weights.

A selected one of the meta-aggregation operators of FIGS. 6-8 can be used alone in order to generate the relevance score $RSV(p,Q)$ for a person p (i.e., $RSV(p,Q)=R_\omega(p,Q)$ where $\omega$ here is one selected index value). The meta-aggregation operator may be selected based on the type of relevance score to be computed, among other factors. It is also contemplated to combine (i.e. aggregate) two or more meta-aggregation operators to generate the relevance score (i.e., $RSV(p,Q) = \oplus_{\{\omega\}} R_\omega(p,Q)$ where $\{\omega\}$ here denotes a set of two or more meta-aggregation operators).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system operative on a set of documents annotated by metadata specifying persons associated with documents and their social roles in the documents wherein the annotated documents define a group of representation modes including at least one content type and at least one social role, the system comprising:
   an electronic processing device configured to perform the operation of:
   computing a relevance score for a person of interest using a set of queries wherein each query has a target social role by performing one of the relevance scoring sequences $R_w(p,Q)$ listed in the tables:

| w  | QE | DE | m'  | m'' | k | d | Sequence |
|----|----|----|-----|-----|---|---|----------|
| 5  | 1  | 0  | N/A | B   | B | B | $\oplus_r \oplus_m C^{(m)}(\oplus_d{}^{r'} x^d, \oplus_k{}^{r'} \oplus_{m''} \cdot E^{(m'')}(q^k))$ |
| 6  | 1  | 0  | N/A | B   | B | A | $\oplus_r \oplus_m \oplus_d{}^{r'} C^{(m)}(x^d, \oplus_k{}^{r'} \oplus_{m''} \cdot E^{(m'')}(q^k))$ |
| 7  | 1  | 0  | N/A | B   | A | B | $\oplus_r \oplus_m \oplus_k{}^{r'} C^{(m)}(\oplus_d{}^{r'} x^d, \oplus_{m''} \cdot E^{(m'')}(q^k))$ |
| 8  | 1  | 0  | N/A | B   | A | A | $\oplus_r \oplus_m \oplus_d{}^{r'} \oplus_k{}^{r'} C^{(m)}(x^d, \oplus_{m''} \cdot E^{(m'')}(q^k))$ |
| 9  | 1  | 0  | N/A | A   | B | B | $\oplus_r \oplus_m \oplus_{m''} \cdot C^{(m)}(\oplus_d{}^{r'} x^d, \oplus_k{}^{r'} E^{(m'')}(q^k))$ |
| 10 | 1  | 0  | N/A | A   | B | A | $\oplus_r \oplus_m \oplus_{m''} \cdot \oplus_d{}^{r'} C^{(m)}(x^d, \oplus_k{}^{r'} E^{(m'')}(q^k))$ |
| 11 | 1  | 0  | N/A | A   | A | B | $\oplus_r \oplus_m \oplus_{m''} \cdot \oplus_k{}^{r'} C^{(m)}(\oplus_d{}^{r'} x^d,$ |

| w | QE | DE | m' | m" | k | d | Sequence |
|---|---|---|---|---|---|---|---|
| 12 | 1 | 0 | N/A | A | A | A | $\oplus_r \oplus_m \oplus_{m'} \cdot \oplus^{r'}_d \oplus^{r'}_k C^{(m)}(x^d, E^{(m'')}(q^k))$ |
| 13 | 0 | 1 | B | N/A | B | B | $\oplus_r \oplus_m C^{(m)}(\oplus^{r'}_d \oplus_{m'} E^{(m')}(x^d), \oplus^{r'}_k q^k))$ |
| 14 | 0 | 1 | B | N/A | B | A | $\oplus_r \oplus_m \oplus^{r'}_d C^{(m)}(\oplus_{m'} E^{(m')}(x^d), \oplus^{r'}_k q^k))$ |
| 15 | 0 | 1 | B | N/A | A | B | $\oplus_r \oplus_m \oplus^{r'}_k C^{(m)}(\oplus^{r'}_d \oplus_{m'} E^{(m')}(x^d), q^k))$ |
| 16 | 0 | 1 | B | N/A | A | A | $\oplus_r \oplus_m \oplus^{r'}_d \oplus^{r'}_k C^{(m)}(\oplus_{m'} E^{(m')}(x^d), q^k))$ |
| 17 | 0 | 1 | B | N/A | B | B | $\oplus_r \oplus_m \oplus_{m'} C^{(m)}(\oplus^{r'}_d E^{(m')}(x^d), \oplus^{r'}_k q^k))$ |
| 18 | 0 | 1 | B | N/A | B | A | $\oplus_r \oplus_m \oplus_{m'} \oplus^{r'}_d C^{(m)}(E^{(m')}(x^d), \oplus^{r'}_k q^k))$ |
| 19 | 0 | 1 | B | N/A | A | B | $\oplus_r \oplus_m \oplus_{m'} \oplus^{r'}_k C^{(m)}(\oplus^{r'}_d E^{(m')}(x^d), q^k))$ |
| 20 | 0 | 1 | B | N/A | A | A | $\oplus_r \oplus_m \oplus_{m'} \oplus^{r'}_d \oplus^{r'}_k C^{(m)}(E^{(m')}(x^d), q^k))$ |

| w | QE | DE | m' | m" | k | d |
|---|---|---|---|---|---|---|
| 21 | 1 | 1 | B | B | B | B |
| 22 | 1 | 1 | B | B | B | A |
| 23 | 1 | 1 | B | B | A | B |
| 24 | 1 | 1 | B | B | A | A |
| 25 | 1 | 1 | B | A | B | B |
| 26 | 1 | 1 | B | A | B | A |
| 27 | 1 | 1 | B | A | A | B |
| 28 | 1 | 1 | B | A | A | A |
| 29 | 1 | 1 | A | B | B | B |
| 30 | 1 | 1 | A | B | B | A |
| 31 | 1 | 1 | A | B | A | B |
| 32 | 1 | 1 | A | B | A | A |
| 33 | 1 | 1 | A | A | B | B |
| 34 | 1 | 1 | A | A | B | A |
| 35 | 1 | 1 | A | A | A | B |
| 36 | 1 | 1 | A | A | A | A |

| w | Sequence |
|---|---|
| 21 | $\oplus_r \oplus_m C^{(m)}(\oplus^{r'}_d \oplus_{m'} E^{(m')}(x^d), \oplus^{r'}_k \oplus_{m''} E^{(m'')}(q^k))$ |
| 22 | $\oplus_r \oplus_m \oplus^{r'}_d C^{(m)}(\oplus_{m'} E^{(m')}(x^d), \oplus^{r'}_k \oplus_{m''} E^{(m'')}(q^k))$ |
| 23 | $\oplus_r \oplus_m \oplus^{r'}_k C^{(m)}(\oplus^{r'}_d \oplus_{m'} E^{(m')}(x^d), \oplus_{m''} E^{(m'')}(q^k))$ |
| 24 | $\oplus_r \oplus_m \oplus^{r'}_d \oplus^{r'}_k C^{(m)}(\oplus_{m'} E^{(m')}(x^d), \oplus_{m''} E^{(m'')}(q^k))$ |
| 25 | $\oplus_r \oplus_m \oplus_{m''} C^{(m)}(\oplus^{r'}_d \oplus_{m'} E^{(m')}(x^d), E^{(m'')}(q^k))$ |
| 26 | $\oplus_r \oplus_m \oplus_{m''} \oplus^{r'}_d C^{(m)}(\oplus_{m'} E^{(m')}(x^d), \oplus^{r'}_k E^{(m'')}(q^k))$ |
| 27 | $\oplus_r \oplus_m \oplus_{m''} \oplus^{r'}_k C^{(m)}(\oplus_{m'} E^{(m')}(x^d), \oplus^{r'}_d E^{(m'')}(q^k))$ |
| 28 | $\oplus_r \oplus_m \oplus_{m''} \oplus^{r'}_d \oplus^{r'}_k C^{(m)}(\oplus_{m'} E^{(m')}(x^d), E^{(m'')}(q^k))$ |
| 29 | $\oplus_r \oplus_m \oplus_{m'} C^{(m)}(\oplus^{r'}_d E^{(m')}(x^d), \oplus^{r'}_k \oplus_{m''} E^{(m'')}(q^k))$ |
| 30 | $\oplus_r \oplus_m \oplus_{m'} \oplus^{r'}_d C^{(m)}(E^{(m')}(x^d), \oplus^{r'}_k \oplus_{m''} E^{(m'')}(q^k))$ |
| 31 | $\oplus_r \oplus_m \oplus_{m'} \oplus^{r'}_k C^{(m)}(\oplus^{r'}_d E^{(m')}(x^d), \oplus_{m''} E^{(m'')}(q^k))$ |
| 32 | $\oplus_r \oplus_m \oplus_{m'} \oplus^{r'}_d \oplus^{r'}_k C^{(m)}(E^{(m')}(x^d), \oplus_{m''} E^{(m'')}(q^k))$ |
| 33 | $\oplus_r \oplus_m \oplus_{m'} \oplus_{m''} C^{(m)}(\oplus^{r'}_d E^{(m')}(x^d), \oplus^{r'}_k E^{(m'')}(q^k))$ |
| 34 | $\oplus_r \oplus_m \oplus_{m'} \oplus_{m''} \oplus^{r'}_d C^{(m)}(E^{(m')}(x^d), \oplus^{r'}_k E^{(m'')}(q^k))$ |
| 35 | $\oplus_r \oplus_m \oplus_{m'} \oplus_{m''} \oplus^{r'}_k C^{(m)}(\oplus^{r'}_d E^{(m')}(x^d), E^{(m'')}(q^k))$ |
| 36 | $\oplus_r \oplus_m \oplus_{m'} \oplus_{m''} \oplus^{r'}_d \oplus^{r'}_k C^{(m)}(E^{(m')}(x^d), E^{(m'')}(q^k))$ | and

| w | Sequence |
|---|---|
| 5bis | $\oplus_r \oplus_m C^{(m)}(\oplus^{r'}_d x^d), \oplus_{m''} E^{(m'')}(\oplus^{r'}_k q^k))$ |
| 6bis | $\oplus_r \oplus_m \oplus^{r'}_d C^{(m)}(x^d, \oplus_{m''} E^{(m'')}(\oplus^{r'}_k q^k))$ |
| 9bis | $\oplus_r \oplus_m \oplus_{m''} C^{(m)}(\oplus^{r'}_d x^d, E^{(m'')}(\oplus^{r'}_k q^k))$ |
| 10bis | $\oplus_r \oplus_m \oplus_{m''} \oplus^{r'}_d C^{(m)}(x^d, E^{(m'')}(\oplus^{r'}_k q^k))$ |
| 13bis | $\oplus_r \oplus_m C^{(m)}(\oplus_{m'} E^{(m')}(\oplus^{r'}_d x^d), \oplus^{r'}_k q^k)$ |
| 15bis | $\oplus_r \oplus_m \oplus^{r'}_k C^{(m)}(\oplus_{m'} E^{(m')}(\oplus^{r'}_d x^d), q^k)$ |

| w | Sequence |
|---|---|
| 17bis | $\oplus_r \oplus_m \oplus_{m'} C^{(m)}(E^{(m')}(\oplus^{r'}_d x^d), \oplus^{r'}_k q^k)$ |
| 19bis | $\oplus_r \oplus_m \oplus_{m'} \oplus^{r'}_k C^{(m)}(E^{(m')}(\oplus^{r'}_d x^d), q^k)$ |
| 21bis | $\oplus_r \oplus_m C^{(m)}(\oplus_{m'} E^{(m')}(\oplus^{r'}_d x^d), \oplus^{r'}_k \oplus_{m''} E^{(m'')}(q^k))$ |
| 21ter | $\oplus_r \oplus_m C^{(m)}(\oplus^{r'}_d \oplus_{m'} E^{(m')}(x^d), \oplus_{m''} E^{(m'')}(\oplus^{r'}_k q^k))$ |
| 21quarter | $\oplus_r \oplus_m C^{(m)}(\oplus_{m'} E^{(m')}(\oplus^{r'}_d x^d), \oplus_{m''} E^{(m'')}(\oplus^{r'}_k q^k))$ |
| 22bis | $\oplus_r \oplus_m \oplus^{r'}_d C^{(m)}(\oplus_{m'} E^{(m')}(x^d), \oplus_{m''} E^{(m'')}(\oplus^{r'}_k q^k))$ |
| 23bis | $\oplus_r \oplus_m \oplus^{r'}_k C^{(m)}(\oplus_{m'} E^{(m')}(\oplus^{r'}_d x^d), \oplus_{m''} E^{(m'')}(q^k))$ |
| 25bis | $\oplus_r \oplus_m \oplus_{m''} C^{(m)}(\oplus_{m'} E^{(m')}(\oplus^{r'}_d x^d), \oplus^{r'}_k E^{(m'')}(q^k))$ |
| 25ter | $\oplus_r \oplus_m \oplus_{m''} C^{(m)}(\oplus^{r'}_d \oplus_{m'} E^{(m')}(x^d), E^{(m'')}(\oplus^{r'}_k q^k))$ |
| 25quarter | $\oplus_r \oplus_m \oplus_{m''} C^{(m)}(\oplus_{m'} E^{(m')}(\oplus^{r'}_d x^d), E^{(m'')}(\oplus^{r'}_k q^k))$ |
| 26bis | $\oplus_r \oplus_m \oplus_{m''} \oplus^{r'}_d C^{(m)}(\oplus_{m'} E^{(m')}(x^d), E^{(m'')}(\oplus^{r'}_k q^k))$ |
| 27bis | $\oplus_r \oplus_m \oplus_{m''} \oplus^{r'}_k C^{(m)}(\oplus_{m'} E^{(m')}(\oplus^{r'}_d x^d), E^{(m'')}(q^k))$ |
| 29bis | $\oplus_r \oplus_m \oplus_{m'} C^{(m)}(E^{(m')}(\oplus^{r'}_d x^d), \oplus^{r'}_k \oplus_{m''} E^{(m'')}(q^k))$ |
| 29ter | $\oplus_r \oplus_m \oplus_{m'} C^{(m)}(\oplus^{r'}_d E^{(m')}(x^d), \oplus_{m''} E^{(m'')}(\oplus^{r'}_k q^k))$ |
| 29quarter | $\oplus_r \oplus_m \oplus_{m'} C^{(m)}(E^{(m')}(\oplus^{r'}_d x^d), \oplus_{m''} E^{(m'')}(\oplus^{r'}_k q^k))$ |
| 30bis | $\oplus_r \oplus_m \oplus_{m'} \oplus^{r'}_d C^{(m)}(E^{(m')}(x^d), \oplus_{m''} E^{(m'')}(\oplus^{r'}_k q^k))$ |
| 31bis | $\oplus_r \oplus_m \oplus_{m'} \oplus^{r'}_k C^{(m)}(E^{(m')}(\oplus^{r'}_d x^d), \oplus_{m''} E^{(m'')}(q^k))$ |
| 33bis | $\oplus_r \oplus_m \oplus_{m'} \oplus_{m''} C^{(m)}(E^{(m')}(\oplus^{r'}_d x^d), \oplus^{r'}_k E^{(m'')}(q^k))$ |
| 33ter | $\oplus_r \oplus_m \oplus_{m'} \oplus_{m''} C^{(m)}(\oplus^{r'}_d E^{(m')}(x^d), E^{(m'')}(\oplus^{r'}_k q^k))$ |
| 33quarter | $\oplus_r \oplus_m \oplus_{m'} \oplus_{m''} C^{(m)}(E^{(m')}(\oplus^{r'}_d x^d), E^{(m'')}(\oplus^{r'}_k q^k))$ |
| 34bis | $\oplus_r \oplus_m \oplus_{m'} \oplus_{m''} \oplus^{r'}_d C^{(m)}(E^{(m')}(x^d), E^{(m'')}(\oplus^{r'}_k q^k))$ |
| 35bis | $\oplus_r \oplus_m \oplus_{m'} \oplus_{m''} \oplus^{r'}_k C^{(m)}(E^{(m')}(\oplus^{r'}_d x^d), E^{(m'')}(q^k))$ | wherein p denotes the person of interest, Q denotes the set of queries, k indexes the queries of the set of queries and $r_k'$ denotes the target social role of query $q^k$, $x^d$ denotes a document where d indexes the documents, $C^{(\cdots)}$ denotes comparison, $\epsilon^{(\cdots)}$ denotes enrichment, $\oplus_i$ denotes aggregation over indices i, m indexes the at least one similarity mode, at least one of m' and m" index the at least one enrichment mode where m' denotes document enrichment mode and m" denotes query enrichment mode and in the table columns headed m' and m" the symbol "B" denotes the enriching is performed before the computing of similarities, the symbol "A" denotes the enriching is performed after the computing of similarities, and the symbol "N/A" denotes the enriching is not performed;

repeating the computing for each person of a set of persons of interest to compute a relevance score for each person of the set of persons of interest, and at least one of (i) ranking the persons of the set of persons of interest respective to relevance score and (ii) selecting a sub-set of persons from the set of persons of interest who have the highest relevance scores.

2. The system of claim 1, wherein the set of documents comprises a set of electronic mail (email) documents, the annotated metadata specifies persons associated with email documents at least using email addresses, and the social roles in the documents include at least (i) email sender and (ii) email recipient.

3. The system of claim 2, wherein the set of queries include a first set of queries in which the target social role is email sender and a second set of queries in which the target social role is email recipient.

4. The system of claim 3, wherein the electronic processing device is further configured to perform operations including:

generating the first set of queries from a set of email documents annotated with a known email address as the email sender; and generating the second set of queries from a set of email documents annotated with the known email address as the email recipient;

wherein the repeating comprises repeating the computing for each of a plurality of different email addresses corresponding to the set of persons of interest to compute a relevance score for each email address; and wherein the selecting (ii) comprises selecting at least one candidate alias email address from the plurality of different email addresses based on the relevance scores.

5. The system of claim 1, wherein the electronic processing device is further configured to perform operations including:
generating the set of queries from a set of query documents annotated by metadata specifying a query person being associated with each query document wherein the target social role of each query is the annotated social role of the query person in the query document from which the query is generated.

6. The system of claim 1, wherein the computing of similarities between documents and queries includes:
computing similarities between documents and queries with respect to at least the text content type.

7. The system of claim 6, wherein the computing of similarities between documents and queries further includes:
computing similarities between documents and queries with respect to the image content type.

8. The system of claim 6, wherein the computing of similarities between documents and queries further includes:
computing similarities between documents and queries with respect to at least one social role.

9. A method to identify a relevant person from a set of persons of interest, the method operating on a set of documents annotated by metadata specifying persons associated with documents and their social context roles in the documents, the method comprising:
(0) receiving or generating a query comprising a content query portion $qx_k$ representing textual content of the query, a social context query portion $qr_k$ specifying one or more persons associated with the query and their social context roles in the query wherein the social context query portion includes an aggregation of social context query portions pertaining to at least two different social context roles, and a target social context role $r_k'$ for the relevant person;
(1) for each document, computing a content-based score respective to the content query portion of the query and a social context-based score respective to the social context query portion of the query;
(2) for each document, computing an enrichment score quantifying similarity of the document with a sub-set of nearest neighbor documents selected from the set of documents based on scores computed in operation (1);
(3) for each document, aggregating the scores computed in operations (1) and (2) to generate a query score for the document;
(4) generating a relevance score for each person of interest of the set of persons of interest by aggregating the query scores computed in operation (3) over the documents of the set of documents that have the person of interest in the target social context role $r_k'$; and
(5) displaying identification of at least the person of interest of the set of persons of interest having the highest relevance score computed in operation (4);
wherein operations (1), (2), (3), (4), and (5) are performed by an electronic data processing device.

10. The method of claim 9, wherein:
the operation (0) receives or generates a set of queries $Q=\{q_k\}$, $k=1, \ldots, K$ wherein each query $q_k$ comprises a content query portion $qx_k$ representing textual content of the query, a social context query portion $qr_k$ specifying one or more persons associated with the query and their social context roles in the query, and a target social context role $r_k'$ for the relevant person, and
the operations (1), (2), and (3) are performed for each query of the set of queries to generate a corresponding set of query scores for the query, and
the operation (4) comprises generating the relevance score for each person of interest by aggregating the set of query scores computed in operation (3) over the documents of the set of documents that have the person of interest in the target social context role $r_k'$.

11. The method of claim 9, wherein the set of documents comprises a set of electronic mail (email) documents, the annotated metadata specifies persons associated with email documents at least using email addresses, and the social context roles in the documents include at least the roles of (i) email sender and (ii) email recipient.

12. The method of claim 9, wherein the content query portion of the query includes a keyword-based query.

13. The method of claim 9, wherein the operation (2) includes at least one of:
(2.1) for each document, computing an enrichment score quantifying similarity of content of the document with content of a sub-set of nearest neighbor documents selected from the set of documents based on the social context-based scores, and
(2.2) for each document, computing an enrichment score quantifying similarity of social context of the document with social context of a sub-set of nearest neighbor documents selected from the set of documents based on the content-based scores.

14. The method of claim 9, wherein the operations (1), (2), (3), and (4) are performed for each query of a set of queries to generate a corresponding set of relevance scores for each person of interest, and the operation (0) comprises:
generating each query from a corresponding query document annotated by metadata specifying a reference person being associated with the query document, the generating including defining the target social context role $r_k'$ of the query as the social context role of the reference person in the corresponding query document;
wherein the generating of each query from a corresponding query document is performed by the electronic data processing device.

15. The method of claim 9, wherein the operation (0) comprises:
generating the query from a query document annotated by metadata specifying a reference person being associated with the query document, the generating including defining the target social context role $r_k'$ of the query as the social context role of the reference person in the query document;
wherein the generating of the query from the query document is performed by the electronic data processing device.

16. A non-transitory storage medium storing instructions executable by a digital processor to perform a method to identify a relevant person from a set of persons of interest, the method operating on a set of documents annotated by metadata specifying persons associated with documents and their social context roles in the documents, the method comprising:
(0) receiving or generating a set of queries, each query comprising a content query portion representing content of the query, a social context query portion specifying one or more persons associated with the query and their social context roles in the query wherein the social context query portion includes an aggregation of social context query portions pertaining to at least two different social context roles, and a target social context role for the relevant person;

(1) for each query of the set of queries:
 (i) for each document, computing a content-based score respective to the content query portion of the query and a social context-based score respective to the social context query portion of the query;
 (ii) for each document, computing an enrichment score quantifying similarity of the document with a sub-set of nearest neighbor documents selected from the set of documents based on scores computed in operation (i);
 (iii) for each document, aggregating the scores computed in operations (i) and (ii) to generate a query score for the document; and
(2) generating a relevance score for each person of interest of the set of persons of interest by aggregating the query scores computed in operation (1) over the documents of the set of documents that have the person of interest in the target social context role; and
(3) displaying identification of at least the person of interest of the set of persons of interest having the highest relevance score in operation (2);
wherein operations (1), (2), and (3) are performed by an electronic data processing device.

* * * * *